United States Patent
Mikoshiba et al.

[11] Patent Number: 6,085,048
[45] Date of Patent: Jul. 4, 2000

[54] SILVER HALIDE CAMERA EQUIPPED WITH ELECTRONIC VIEWFINDER

[75] Inventors: Hironobu Mikoshiba; Haruki Nakayama; Hiroyuki Horiuchi, all of Hachioji, Japan

[73] Assignee: Konica Corporation, Japan

[21] Appl. No.: 09/093,604

[22] Filed: Jun. 9, 1998

[30] Foreign Application Priority Data

| Jun. 11, 1997 | [JP] | Japan | 9-153616 |
| Jun. 11, 1997 | [JP] | Japan | 9-153617 |
| Jul. 4, 1997 | [JP] | Japan | 9-179617 |

[51] Int. Cl.$^7$ ............................................. G03B 13/02
[52] U.S. Cl. .......................................... 396/374; 396/429
[58] Field of Search ............................... 396/373, 374, 396/429, 538

[56] References Cited

U.S. PATENT DOCUMENTS

| 4,757,388 | 7/1988 | Someya et al. . | |
| 5,179,478 | 1/1993 | Aoki . | |
| 5,420,661 | 5/1995 | Hamada et al. | 396/55 |
| 5,557,358 | 9/1996 | Mukai et al. | 396/374 |
| 5,664,243 | 9/1997 | Okada et al. | 396/429 |
| 5,845,168 | 12/1998 | Stiehler et al. | 396/538 |
| 5,870,644 | 2/1999 | Naka et al. | 396/538 |

FOREIGN PATENT DOCUMENTS

| 0851274 | 1/1998 | European Pat. Off. . |
| 8331431 | 12/1996 | Japan . |

OTHER PUBLICATIONS

European Search Report EP 98 11 0721.

*Primary Examiner*—Russell Adams
*Attorney, Agent, or Firm*—Jordan B. Bierman; Bierman, Muserlian and Lucas

[57] ABSTRACT

A camera for photographing by exposing a silver halide film, includes: a silver halide photographing device having a lens and a shutter wherein a photographing is conducted by exposing the silver halide film through the lens and the shutter; and an electronic viewfinder having a solid-state image sensor and a direct-vision type image displaying section, for displaying an image picked up by the image sensor on the direct-vision type image displaying section. The image displaying section of the electronic viewfinder is disposed on a rear side of a main body of the camera.

13 Claims, 26 Drawing Sheets

(H-TYPE DISPLAYING AREA)

(C-TYPE DISPLAYING AREA)

(P-TYPE DISPLAYING AREA)

FIG. 11

EXAMPLE OF EACH APEX VALUE

| EACH APEX VALUE (AV,TV,BV,SV) | APERTURE VALUE (Fno) | SHUTTER SPEED (Sec) | OBJECT BRIGHTNESS ($cd/m^2$) | FILM SENSITIVITY (ISO) |
|---|---|---|---|---|
| -2 | 0.5 | 4 | 1.1 | — |
| -1 | 0.7 | 2 | 2.2 | — |
| 0 | 1 | 1 | 4.5 | — |
| 1 | 1.4 | 1/2 | 9 | — |
| 2 | 2 | 1/4 | 18 | 12 |
| 3 | 2.8 | 1/8 | 36 | 25 |
| 4 | 4 | 1/15 | 72 | 50 |
| 5 | 5.6 | 1/30 | 140 | 100 |
| 6 | 8 | 1/60 | 290 | 200 |
| 7 | 11 | 1/125 | 570 | 400 |
| 8 | 16 | 1/250 | 1100 | 800 |
| 9 | 22 | 1/500 | 2300 | 1600 |
| 10 | 32 | 1/1000 | 4600 | 3200 |

FIG. 12

EXAMPLE OF GV

| GV | GAIN (dB) |
|---|---|
| 0 | 0 (ONCE) |
| 1 | 6 (TWICE) |
| 2 | 12 (4 TIMES) |
| 3 | 18 (8 TIMES) |

SILVER HALIDE CAMERA EQUIPPED WITH ELECTRONIC VIEWFINDER

BACKGROUND OF THE INVENTION

The present invention relates to a silver halide camera equipped with an electronic viewfinder to confirm a photographed image.

Common cameras (hereinafter, called silver halide camera) to take a picture on silver halide film, are structured such that each camera is equipped with an optical viewfinder, through which a photographing object is confirmed.

In such a silver halide camera, unlike a video camera or a digital camera, there is a problem that an actually photographed image can not be confirmed just after picture-taking.

For such the confirmation, it is considered that the silver halide camera is equipped with an electronic viewfinder composed of a solid state image sensor (CCD, or the like) and an display device (LCD, or the like), which displays an image picked up by the solid state image sensor as a dynamic image before picture-taking, and as a static image just after the picture-taking.

When the electronic viewfinder is equipped on the silver halide camera, it is considered that a little smaller electronic viewfinder is equipped to the silver halide camera so that the size is reduced, in which the electronic viewfinder is an indirect-vision type electronic viewfinder of a type, looked through an optical system such as a lens, or the like, in the same manner as in the case of conventional optical viewfinder. However, because a sharp image is required for the viewfinder for the photograph, a small-sized and highly accurate electronic viewfinder is necessary in this type of indirect-vision type electronic viewfinder, resulting in an increase of cost, which is a problem. Further, there is also a problem that it is too small to look through.

Accordingly, a structure is considered in which the electronic viewfinder is made a little larger so as to be easily looked at, and it is provided separately from the silver halide camera. However, in such the structure, carrying is inconvenient.

An object of the present invention is to obtain a silver halide camera which can be easily carried, and is equipped with an electronic viewfinder which can be easily looked at.

As the result of a diligent investigation, the inventor of the present invention has found that, when an image display section of a direct-vision type electronic view finder is equipped on the back surface of the main body of the silver halide camera, the silver halide camera which can be easily carried, and is equipped with an electronic viewfinder which can be easily looked at, can be obtained. Thereby, in also the silver halide camera, the actually photographed image can be more easily identified just after picture-taking.

However, in the camera in which a rear cover of the back surface of the main body is opened for film loading, when an image display section of the direct-vision type electronic viewfinder is equipped on the back surface of the silver halide camera, the whole of image LCD including a back light is required to move integrally with the rear cover, and thereby, there is a problem that mechanisms are complicated.

Further, the ratio of a length to width (an aspect ratio) of the image to be recorded on the film is different from that of the image LCD. Further, there are a plurality of types of images to be recorded on the film.

For example, the film, called IX-240, has s hatched recording area as shown in FIG. 8, and has a ratio of the length 9 to width 16.

The whole of the recording area having a ratio of 9:16 is used for recording, however, there are cases in which an image of the hatched area portion (9:16) in FIG. 8(a) is printed (H-type), an image of the hatched area portion (2:3) in FIG. 8(b) is printed (C-type), or an image of the hatched area portion (1:3) in FIG. 8(c) is printed (P-type).

Further, when such the designation is conducted at the time of picture-taking, the display in the optical viewfinder is as shown in FIG. 9(a) in the H-type, as shown in FIG. 9(b) in the C-type, and as shown in FIG. 9(c) in the P-type, and the hatched portion is covered by a light-shielding member or a liquid crystal shutter.

In the above cases, when a displaying area of the image LCD (the length 3: the width 4) is adjusted to the maximum area of one frame of the film to display an image, it is as shown by a double hatched portion in FIG. 10(a) in the H-type, and as shown by a double hatched portion in FIG. 10(c) in the P-type.

As the result, an entirely unused area exists in an upper and a lower portions of the image LCD, in any case of display of the H-type, C-type and P-type, and a useless area is produced in the displaying area of the image LCD.

Further, in common electronic viewfinders, an iris diaphragm is not provided, and the exposure control is conducted by an electronic shutter for the CCD. Therefore, the shutter speed of the electronic shutter for the CCD is different from that of the silver halide camera side.

Accordingly, the method of use in which an object is photographed at the same shutter speed on the silver halide film side as the shutter speed for the CCD side and a condition of the photographed image of an object moving at a high speed is confirmed, or a condition of the blurred image is confirmed, is not allowable.

Further, in the silver halide film, there are several film sensitivity (ISO 25, 50, 64, 100, 200, 400, . . . ), and when the film sensitivity is greatly different from the CCD sensitivity, the difference between both shutter speeds becomes greater.

In this connection, the diaphragm mechanism can also be provided on the CCD side, however, in that case, in the CCD whose light receiving area is smaller than that of the silver halide film, it is necessary to increase the accuracy corresponding to the reduced area.

Further, in order to absorb the difference of sensitivity of the silver halide film, a diaphragm mechanism having an aperture value variable range broader than that of the silver halide film side, is necessary. Therefore, the diaphragm device on the CCD side becomes greatly expensive, and becomes large-sized, which is a problem.

Further, the electronic viewfinder consumes a large amount of electric power for CCD driving and LCD driving, which is disadvantageous.

Further, a large current is necessary when the image display of the electronic viewfinder, and shutter driving and lens driving for picture-taking on the silver halide camera side, are simultaneously conducted, and therefore, the power supply voltage is the more lowered. Thereby, the electric power can not be sufficiently supplied from the power source to each circuit, so that sometimes a normal operation can not be conducted.

Further, because image picking-up is continued even while the operator does not specifically need it, useless electric power is consumed, thereby, a problem occurs in which an available working time is shortened.

SUMMARY OF THE INVENTION

The present invention has been accomplished in view of the foregoing technological problems, and an object of the present invention is to provide a silver halide camera equipped with an electronic viewfinder, by which the photographed image can be confirmed, and which is easily carried and easily viewed.

Another object of the present invention is to provide a silver halide camera equipped with an electronic viewfinder by which an image display can be effectively conducted without any useless area on the image LCD of the electronic viewfinder section.

A further object of the present invention is to provide a silver halide camera equipped with an electronic viewfinder in which no complicated diaphragm mechanism is provided on the electronic viewfinder side, and by which image picking-up of the electronic viewfinder can be carried out at the same shutter speed as the picture-taking shutter speed of the silver halide film side.

A still further object of the present invention is to provide a silver halide camera equipped with an electronic viewfinder in which the electric power can be effectively and sufficiently supplied.

That is, the above objects are attained by any one of the following structures.

(1) A silver halide camera equipped with an electronic viewfinder, provided with a silver halide picture-taking means by which a picture is taken by exposing the silver halide film through a lens and a shutter, and an electronic viewfinder means by which an image picked up by a solid state image sensor is displayed on an image display section, the silver halide camera equipped with an electronic view finder is characterized in that the image display section of the electronic viewfinder means is equipped on the rear surface of the main body.

In the silver halide camera equipped with the electronic view finder, it is provided with the electronic viewfinder means, and the image display section of the electronic viewfinder means is equipped on the rear surface of the camera, thereby, the photographed image can be confirmed without developing or printing the silver halide film.

(2) The silver halide camera equipped with the electronic viewfinder of the structure (1), is characterized in that the silver halide picture-taking means uses the silver halide film accommodated in a cartridge, and the cartridge is loaded from the bottom surface of the camera main body along the direction of the central axis for winding up the silver halide film.

Since the silver halide camera equipped with the electronic viewfinder is structured such that the cartridge of the silver halide film is loaded from the bottom surface side of the camera main body along the central axis for winding up the silver halide film, it is not necessary to open/close the rear surface of the camera main body, so that the image display section of the electronic viewfinder means can be equipped on the rear surface of the camera, a complicated structure is not necessary, and the photographed image can be identified without developing or printing the silver halide film.

(3) The silver halide camera equipped with the electronic viewfinder of the structure (1) or (2) is characterized in that the image display section of the electronic viewfinder means is movable with respect to the camera main body.

Since the silver halide camera equipped with the electronic viewfinder is structured such that the image display section of the electronic viewfinder means is movable with respect to the camera main body, the photographed image can easily be identified without developing or printing the silver halide film. Further, even in the environment in which the optical viewfinder of the silver halide camera can hardly be used, the photographed image can be identified.

(4) The silver halide camera equipped with the electronic viewfinder of the structure (1) to (3) is characterized in that the image display section of the electronic viewfinder is detachably provided with respect to the camera main body.

Since the silver halide camera equipped with the electronic viewfinder is structured such that the image display section of the electronic viewfinder means is detachable with respect to the camera main body, not only the photographed image can be confirmed, but also even in the environment in which the optical viewfinder can hardly be used (low angle picture-taking, or the like), or even from a position separated from the camera main body, the photographed image can be identified or framing before picture-taking is possible.

(5) The silver halide camera equipped with the electronic viewfinder of the structure (1) to (4) is characterized in that the electronic viewfinder means displays an image at the same angle of view as that of the image to be photographed and recorded on the silver halide film in the silver halide picture-taking means.

In the silver halide camera equipped with the electronic viewfinder, because the electronic viewfinder means displays an image at the same angle of view as that of the image to be photographed and recorded on the silver halide film in the silver halide picture-taking means, a picture-taking condition on the film can be confirmed without developing or printing the silver halide film.

(6) The silver halide camera equipped with the electronic viewfinder of the structure (1) to (5) is characterized in that the electronic viewfinder means refers to aspect ratio information of each image specified by the silver halide picture-taking means, and displays the image by the corresponding aspect ratio.

In the silver halide camera equipped with the electronic viewfinder, because the electronic viewfinder means also displays an image corresponding to the aspect ratio of each image specified by the silver halide picture-taking means, the state of a print of a photographed image can be confirmed without developing or printing the silver halide film.

(7) The silver halide camera equipped with the electronic viewfinder of the structure (6) is characterized in that the electronic viewfinder means adjusts the image magnification so that the electronic viewfinder means has the maximum area within a range in which the image display section can display, and displays an image, when it displays the image corresponding to the aspect ratio of the silver halide picture-taking means.

In the silver halide camera equipped with the electronic viewfinder, because the electronic viewfinder means also displays an image corresponding to the aspect ratio of each image specified in the silver halide picture-taking means, and at the time of such the image display, it adjusts the image magnification so that the electronic viewfinder means has the maximum area within a range in which the image display section can display, and displays an image, a picture-taking condition on the film can be confirmed without developing or printing the silver halide film, and the displaying area of the image display section can be effectively used.

(8) The silver halide camera equipped with the electronic viewfinder of the structure (7) is characterized in that the electronic viewfinder means uses image processing when it adjusts the image magnification so that the electronic viewfinder means has the maximum area within a range in which the image display section can display, and displays an image.

In the silver halide camera equipped with the electronic viewfinder, because the electronic viewfinder means also displays an image corresponding to the aspect ratio of each image specified in the silver halide picture-taking means, and at the time of such the image display, it adjusts the image magnification by using image processing such as electronic zooming so that the electronic viewfinder means has the maximum area within a range in which the image display section can display, and displays an image, a picture-taking condition on the film can be confirmed without developing or printing the silver halide film, and the displaying area of the image display section can be effectively used.

(9) The silver halide camera equipped with the electronic viewfinder of the structure (7) is characterized in that the electronic viewfinder means uses variable magnification of the optical system of the electronic viewfinder means when it adjusts the image magnification so that the electronic viewfinder means has the maximum area within a range in which the image display section can display, and displays an image.

In the silver halide camera equipped with the electronic viewfinder, because the electronic viewfinder means also displays an image corresponding to the aspect ratio of each image specified in the silver halide picture-taking means, and at the time of such the image display, it adjusts the image magnification by the optical system of the electronic viewfinder section so that the electronic viewfinder means has the maximum area within a range in which the image display section can display, and displays an image, a picture-taking condition on the film can be confirmed without developing or printing the silver halide film, and the displaying area of the image display section can be effectively used.

(10) The silver halide camera equipped with the electronic viewfinder, provided with a silver halide picture-taking means which has a diaphragm means for film which can change an aperture value when the flux of incident light is stopped down, and which takes a picture onto the silver halide film; an electronic viewfinder means for displaying an image picked up by a solid state image sensor; and a control means for controlling the shutter speed of the silver halide picture-taking means corresponding to an exposure value, the silver halide camera equipped with the electronic viewfinder is characterized in that the control means makes the shutter speed of the electronic viewfinder means almost coincide with the shutter speed of the silver halide picture-taking means, and controls an amplification factor of an image pick-up signal of the electronic viewfinder means so that the optimum exposure can be obtained at the shutter speed.

In the silver halide camera equipped with the electronic viewfinder, by the control of the control means, the shutter sped of the electronic viewfinder means is made to almost coincide with the shutter speed of the silver halide picture-taking means, and an amplification factor of an image pick-up signal of the electronic viewfinder means is controlled so that the optimum exposure can be obtained at the shutter speed.

That is, the shutter speed of the electronic viewfinder means side is also interlocked with that of the silver halide picture-taking means determined from the exposure value and controlled so that these shutter speeds are almost equal, and the amplification factor of the image pick-up signal is controlled so that the optimum exposure can be obtained in the electronic viewfinder means at the shutter speed. Accordingly, it is not necessary to provide any complicated mechanism on the electronic viewfinder side, in spite of the silver halide film sensitivity or an aperture value of the silver halide film side, and image picking-up of the electronic viewfinder can be carried out at almost the same shutter speed as that of the silver halide film side.

Accordingly, both the silver halide film and the solid state image sensor can be appropriately exposed at the same shutter speed.

(11) The silver halide camera equipped with the electronic viewfinder, provided with a silver halide picture-taking means which has a diaphragm means for film which can change an aperture value when the flux of incident light is stopped down, and which takes a picture onto the silver halide film; a diaphragm means for the solid state image sensor which can change stepwise an aperture value when the flux of incident light is stopped down; an electronic viewfinder means for displaying the picked-up image by the solid state image sensor; a control means for controlling the shutter speed of the silver halide picture-taking means from an exposure value, the silver halide camera equipped with the electronic viewfinder is characterized in that the control means makes the shutter speed of the electronic viewfinder means almost coincide with that of the silver halide picture-taking means, and controls the aperture value of the diaphragm member for the solid state image sensor of the electronic viewfinder means and an amplification factor of the image pick-up signal so that the optimum exposure can be obtained at the shutter speed.

In the silver halide camera equipped with the electronic viewfinder, by the control of the control means, the shutter speed of the electronic viewfinder is made almost equal to that of the silver halide picture-taking means, and an amplification factor of the image pick-up signal of the electronic viewfinder means and the aperture value of the diaphragm means for the solid state image sensor are controlled so that the optimum exposure can be obtained at the shutter speed.

That is, the shutter speed of the electronic viewfinder means side is also interlocked with that of the silver halide picture-taking means determined from the exposure value and controlled so that these shutter speeds are almost equal, and the amplification factor of the image pick-up signal and the aperture value of the diaphragm means for the solid state image sensor are controlled so that the optimum exposure can be obtained in the electronic viewfinder means at the shutter speed.

In this case, because the optimum exposure is determined by both of the amplification factor and the aperture value in the electronic viewfinder means, the diaphragm means for solid state image sensor may have a simple stepwise aperture value.

Accordingly, it is not necessary to provide any complicated diaphragm mechanism on the electronic viewfinder side, in spite of the silver halide film sensitivity or an aperture value of the silver halide film side, and image picking-up of the electronic viewfinder can be carried out at almost the same shutter speed as that of the silver halide film side.

Accordingly, at the equal shutter speed, both of the silver halide film and the solid state image sensor can be appropriately exposed.

(12) A silver halide camera equipped with an electronic viewfinder, comprising a silver halide picture-taking means by which a picture is taken by exposing the silver halide film through a lens and a shutter; an electronic viewfinder means by which an image picked up by a solid state image sensor is displayed on an image display section; and a control means for stopping the display of the electronic viewfinder means while at least one of a lens or a shutter of the silver halide picture-taking means is driven.

In the silver halide camera equipped with the electronic viewfinder, the control means controls the electronic viewfinder means so that the image display of the electronic viewfinder means is stopped while the silver halide picture-taking means drives the lens or the shutter for taking a picture onto the silver halide film.

By such the control, driving of the lens or the shutter of the silver halide picture-taking means and the image display of the electronic viewfinder means are not conducted simultaneously, and a large current, caused by driving both simultaneously, does not flow, thereby, the electric power can sufficiently be supplied from the electric power source to each circuit, and normal operations are maintained. As the result, the electric power can be supplied effectively and sufficiently.

(13) A silver halide camera equipped with an electronic viewfinder, comprising a silver halide picture-taking means by which a picture is taken by exposing the silver halide film through a lens and a shutter; an electronic viewfinder means by which an image picked up by a solid state image sensor is displayed on an image display section; a setting input means for setting a picture-taking mode or date; and a control means for stopping the drive of the solid state image sensor of the electronic viewfinder means while the setting input means sets data.

In the silver halide camera equipped with the electronic viewfinder, the control means controls the electronic viewfinder means so that the drive of the solid state image sensor of the electronic viewfinder means is stopped while setting is carried out from the setting input means.

In this control, it is noticed that, while the operator sets data from the setting input means, image pick-up of the electronic viewfinder means is not necessary, and at least the drive of the solid state image sensor is stopped.

That is, set data from the setting input means or the content of input itself may be displayed on the display means of the electronic viewfinder. Further, when a data display means is separately provided from the electronic viewfinder means, the electronic viewfinder means is controlled so that the drive of the solid state image sensor and the display of the image display section are stopped.

Accordingly, when the image pick-up of the electronic viewfinder means is stopped while the operator does not need it, useless electric power consumption can be suppressed. As the result, the electric power can be supplied effectively and sufficiently.

(14) A silver halide camera equipped with an electronic viewfinder, comprising a silver halide picture-taking means by which a picture is taken by exposing the silver halide film through a lens and a shutter; an electronic viewfinder means by which an image picked up by a solid state image sensor is displayed on an image display section; an operation means for accepting predetermined operations before picture-taking; and a control means which detects that an operation is conducted in the operation means, and drives the solid state image sensor and the display section of the electronic viewfinder means.

In the silver halide camera equipped with the electronic viewfinder, the control means detects that an operation is conducted in the operation means, and controls the solid state image sensor and the display section of the electronic viewfinder means so that these members are driven.

In the control, it is noticed that the image pick-up and the display of the electric viewfinder are not necessary until the operator conducts any operation relating to the picture-taking from the operation means, and the drive of the solid state image sensor and the display on the display section are stopped. When the operator conducts any operation relating to the picture-taking from the operation means, the drive of the solid state image sensor and the display on the display section are started. As the operation relating to the picture-taking in this case, halfway-pressing of a release switch, an operation of a zoom switch, gripping a grip, etc., corresponds to that operation.

Accordingly, when the image pick-up and display of the electronic viewfinder means are stopped while the operator does not intend to take a picture, and the image pick-up and display of the electronic viewfinder means are started when the operator intends to take a picture, then, useless electric power consumption can be suppressed. As the result, the electric power can be supplied effectively and sufficiently.

In this connection, when the operator operates any operation relating the picture-taking from the operation means, after the drive of the image pick-up element and the display on the display section are started, the drive of the image pick-up element and the display on the display section may be stopped after a predetermined period of time passes. In this case, also when any operation is conducted, but actually picture-taking is not conducted, useless power consumption can be suppressed.

(15) A silver halide camera equipped with an electronic viewfinder, comprising a silver halide picture-taking means by which a picture is taken by exposing the silver halide film through a lens and a shutter; an electronic viewfinder means by which an image picked up by a solid state image sensor is displayed on an image display section; an operation means for accepting operations relating to picture-taking; and a control means by which the image, obtained in the electronic viewfinder means in timed relationship with the picture-taking in the silver halide picture-taking means, is displayed as a static image, and which detects that an operation is conducted in the operation means before picture-taking, and switches the image display of the electronic viewfinder means from a static image to a dynamic image.

In the silver halide camera equipped with the electronic viewfinder, the control means detects that an operation is conducted in the operation means, and controls the electronic viewfinder means so that the display of the electronic viewfinder means is switched from a static image display to a dynamic image display.

In the control, it is noticed that the image pick-up and the dynamic image display of the electric viewfinder are not necessary until the operator conducts any operation relating to the picture-taking from the operation means, and the drive of the solid state image sensor is stopped and the static image display of the just previously photographed image is conducted. When the operator conducts any operation relating to the picture-taking from the operation means, the drive of the solid state image sensor is started and the dynamic image display on the display section is started. As the operation relating to the picture-taking in this case, halfway-pressing of a release switch, an operation of a zoom switch, gripping a grip, etc., corresponds to that operation.

Accordingly, when the drive of the solid state image sensor is stopped while the operator does not intend to take a picture, and the drive of the solid state image sensor is started when the operator intends to take a picture, then, useless electric power consumption can be suppressed. As the result, the electric power can be supplied effectively and sufficiently.

(16) A silver halide camera equipped with an electronic viewfinder, comprising an optical viewfinder means; a silver halide picture-taking means by which a picture is taken by exposing the silver halide film through a lens and a shutter; an electronic viewfinder means by which an image picked up by a solid state image sensor is displayed in a plurality of display modes on an image display section; an electric power source means for supplying the electric power to the silver halide picture-taking means and the electric viewfinder means; and a display mode switching means for switching the plurality of display modes of the image display section while keeping the electric power supply to the silver halide picture-taking means.

In the silver halide camera equipped with an electronic viewfinder, the display mode switching means controls the electronic viewfinder means so that the plurality of display modes of the electronic viewfinder means are switched.

Accordingly, when the display of the electronic viewfinder means is switched corresponding to the electric power consumption, the minimum of operation of the silver halide picture-taking means is maintained, and the electric power can be effectively supplied so that the overall working time is extended.

(17) In the structure (16), the silver halide camera equipped with an electronic viewfinder, having a display switching operation section to output a switching signal to the display mode switching means when manually operated, wherein the display mode switching means switches the plurality of display modes according to the switching signal from the display switching operation section.

In the silver halide camera equipped with the electronic viewfinder, the display mode switching means controls the electronic viewfinder means so that the plurality of display modes of the electronic viewfinder means are switched according to the switching signal from the display mode switching operation section.

Accordingly, when the display of the electronic viewfinder means is switched corresponding to the electric power consumption, the minimum of operation of the silver halide picture-taking means is maintained, and the electric power can be effectively supplied so that the overall working time is extended.

(18) In the structure (16), the silver halide camera equipped with an electronic viewfinder, having a power source condition detection means for detecting the consumption condition of the electric power source means and outputting a plurality of switching signals corresponding to the consumption condition, wherein the display mode switching means switches the plurality of display modes according to the switching signal from the power source condition detection means.

In the silver halide camera equipped with an electronic viewfinder, the display mode switching means controls the electronic viewfinder means so that the plurality of display modes of the electronic viewfinder means are switched according to the switching signal from the power source condition detecting means.

Accordingly, when the display of the electric viewfinder means is switched corresponding to the detected consumption of the power source, the minimum of operation of the silver halide picture-taking means is maintained, and the electric power can be effectively supplied so that the overall working time is extended.

(19) In the structures (16) to (18), the silver halide camera equipped with the electronic viewfinder, having, as the plurality of display modes, at least either one display mode of (1) a mode to display the static image for confirming the photographed image, or (2) a mode in which the image pick-up and the dynamic image/static image display are not conducted; and (3) a mode in which the image pick-up and the dynamic image display to confirm the object before picture-taking and the static image display to confirm the photographed image are conducted.

In the silver halide camera equipped with the electronic viewfinder, the electronic viewfinder means is controlled so that the image pick-up and the display of the electronic viewfinder means are stopped stepwise corresponding to the degree of the consumption of the electric power source means.

In this control, when the electric power source is sufficiently usable, as the first step, the image pick-up and the dynamic image display to confirm the object before picture-taking and the static image display to confirm the photographed image are conducted, and the all functions of the electronic viewfinder means are used.

Further, when the electric power source is consumed in some degree, as the second step, the static image display is conducted to confirm the photographed image, and a portion of functions of the electric viewfinder means is limited, the operation of the silver halide picture-taking means is maintained while the electric viewfinder means is being used.

When the electric power source is further consumed, as the third step, the image pick-up and the dynamic image/static image display are stopped, and therefore, a great part of functions of the electric viewfinder are stopped, the operation of the silver halide picture-taking means side is maintained. In this case, the object can be confirmed before picture-taking through the optical viewfinder.

Further, the control of the first step and the second step, or the control of the first step and the third step, may also be allowable.

Accordingly, when the operation of the electric viewfinder means is switched stepwise corresponding to the degree of consumption of the power source, a troublesome operation such as switching of operation modes of the electronic viewfinder is not forced on the operator, and the minimum of operation of the silver halide picture-taking means is maintained, and the electric power can be effectively supplied so that the overall working time is extended.

(20) A silver halide camera equipped with an electronic viewfinder, comprising an optical viewfinder means; a silver halide picture-taking means by which a picture is taken by exposing the silver halide film through a lens and a shutter; an electronic viewfinder means by which an image picked up by a solid state image sensor is displayed in a plurality of display modes on an image display section; and a display start operation section to make the image display section display the image.

In the silver halide camera equipped with the electronic viewfinder, the display start operation section controls the electric viewfinder means so that the display of the electric viewfinder means is started according to the signal from the display start operation section.

Accordingly, the display is started by the manual operation, thereby, a useless display of the electric viewfinder section can be prevented, the operation of the silver halide picture-taking means is maintained, and the electric power can be effectively supplied so that the overall working time is extended.

(21) A silver halide camera equipped with the electronic viewfinder, comprising a silver halide picture-taking means by which a picture is taken by exposing the silver halide film through a lens and a shutter; an electronic viewfinder means by which an image picked up by a solid state image sensor is displayed on an image display section which is movably arranged to display the image; a switch means for detecting the movement condition of the display section of the electronic viewfinder means; and a control means for operating the electronic viewfinder means when the control means refers to the result of detection by the switch means and the display section is moved to a predetermined position.

In the silver halide camera equipped with the electronic viewfinder, the control means refers to the result of detection by the switch means and controls the electric viewfinder means so that the electric viewfinder means is operated when the display section is moved to a predetermined position.

In this control, it is noticed that the image pick-up and display of the electronic viewfinder are not necessary until the operator moves the display section to a predetermined position, and the drive of the solid state image sensor and the display on the display section are stopped until the display section is moved to the predetermined position. When the operator has moved the display section to the predetermined position, the drive of the solid state image sensor and the display on the display section are started.

As a predetermined position of the display section in this case, a position to which the display section is taken out from a housing position on the rear surface of the silver halide camera, corresponds to that position.

As described above, when the condition of the display section and the display operation of the electronic viewfinder means are interlocked with each other, the image pick-up and the display of the electronic viewfinder means are stopped in a period of time during which the operator does not intend to take a picture, and when the operator intends to take a picture, the image pick-up and the display of the electronic viewfinder means can be started. Thereby, useless electric power consumption can be suppressed. As the result, the electric power can be supplied effectively and sufficiently.

BRIEF DESCRIPTION OF THE DRAWINGS

FIG. 11 is an illustration showing an example of an APEX value of an aperture value, the shutter speed, the object brightness and the film sensitivity when an exposure value is determined.

FIG. 12 is an illustration showing an example of an APEX value of an amplification factor (gain) of an image pick-up signal when an exposure value is determined.

DETAILED DESCRIPTION OF THE PREFERRED EMBODIMENT

An example of the present invention will be detailed below.

Figure 1:
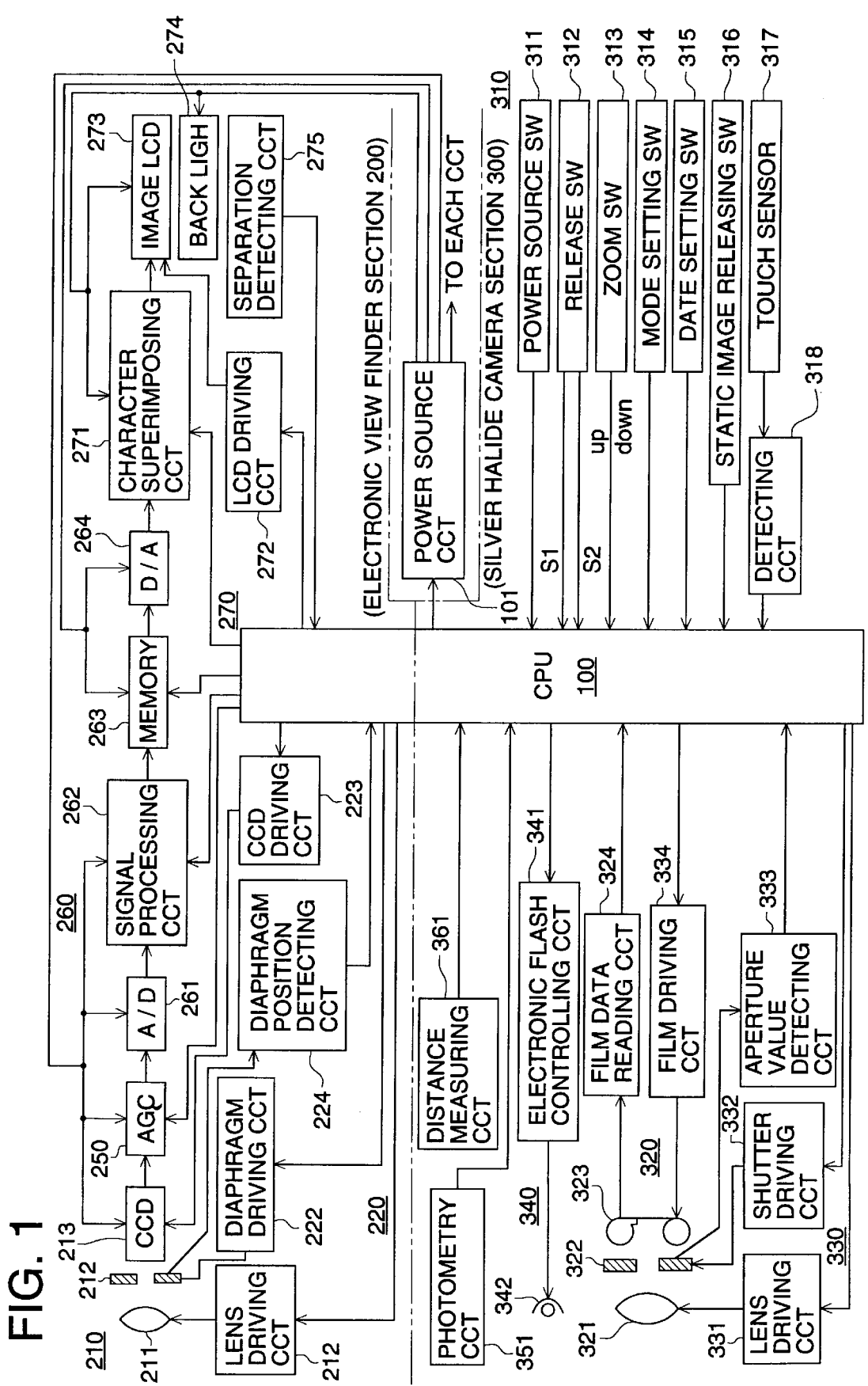
FIG. 1 is a functional block diagram showing the structure of a silver halide camera equipped with the electronic viewfinder used in an example of the present invention.

Initially, referring to FIG. 1, an overall structure of a silver halide camera equipped with an electronic viewfinder used in the present example will be described below. FIG. 1 is a functional block diagram showing an overall electrical general structure of the silver halide camera equipped with the electronic viewfinder of an example of the present invention. (The electrical structure of the silver halide camera equipped with an electronic viewfinder)

The silver halide camera equipped with an electronic viewfinder in the present example shown in FIG. 1, can be divided broadly into a CPU 100 to control each section, an electronic viewfinder section to display an image picked up by a CCD on an image LCD, and a silver halide camera section 300 to take a picture on the silver halide film.

Herein, the CPU 100 structures a control means to control each section, and conducts various control, which will be described later. Further, it structures also a calculation means to calculate a predetermined calculation.

Further, a power supply circuit 101 steps up and generates voltage of +5 V, +3.3 V, +15 V, −9 V, etc., which are necessary for each section of an overall camera body of a silver halide camera equipped with an electronic viewfinder shown in FIG. 1, according to the designation from the CPU 100.

The electronic viewfinder section 200 comprises an image pick-up optical system 210 composed of a lens 211, a diaphragm for CCD 212, a CCD 213 as an image pick-up element, etc.; an image pick-up processing circuit system 220 composed of a lens driving circuit 221, a diaphragm driving circuit 222, a diaphragm position detecting circuit 224, a CCD driving circuit 223, etc.; an AGC circuit 250 to amplify an analog image signal obtained from the CCD 213 by a predetermined amplification factor; a digital image data circuit system 260 composed of an A/D conversion circuit 261, a signal processing circuit 262 to conduct image processing on a digital image signal, a memory 263 for image accumulation, and a D/A conversion circuit 264; and a display system 270 composed of a character superimposing circuit 271, an LCD driving circuit 272, an image LCD 273, a back light 274 for the image LCD 273, and a separation detecting switch 275.

In such the electronic viewfinder section 200, a light image obtained through the optical system 210 composed of the lens 211, the diaphragm for CCD 212, and the like, is formed on the light receiving surface of the CCD 213.

In this case, the lens 211 and the diaphragm 212 are respectively driven by the lens driving circuit 221 and the diaphragm driving circuit 222. Further, the diaphragm position Of the diaphragm 212 is detected by the diaphragm position detecting circuit 224.

The lens driving circuit 221 is composed of, for example, a stepping motor, changes the lens position by the control of the CPU 100, and an optical focusing surface of an object is appropriately adjusted on the CCD 213. Further, the diaphragm driving circuit 222 optically changes the aperture value by the control of the CPU 100.

A gain of an analog image signal outputted from the CCD 213 is adjusted by the AGC circuit 250, and the image signal is knee-processed for dynamic range extension at need.

After, the analog image signal has been converted into a digital image signal by the A/D conversion circuit 261, brightness processing, color processing, electronic zooming are conducted on the signal by the signal processing circuit 262, the signal is converted into a digital video signal (for example, brightness signal (Y), color difference signal (Cr, Cb)), and is stored in a memory 263.

The digital video signal stored in the memory 263 is restored to the analog video signal by the D/A conversion circuit 264, the predetermined character information is superimposed on the signal by a character superimposing circuit 271, and is displayed on the image LCD 273. In this case, the image obtained on the CCD 213 is renewed at every 1 field or 1 frame, and is displayed in real time. When picture-taking by a silver halide camera section 300, which will be described later, is conducted, an image exposed on the film is displayed as a static image. Such the control is carried out according to the designation of the CPU 100.

Further, the silver halide section 300 is structured by an operation display section 310 composed of a power source switch 311 for turning on overall power source, a two-step pressing release switch 312 for picture-taking, a mode setting switch 314 for each mode setting, a date setting switch 315 for date setting, a static image releasing switch 316 to switch a static image display to a dynamic image display, a touch sensor 317 provided on a grip, or the like, a detection circuit 318 to detect a condition of the touch sensor 317, and the like; an image pick-up optical system 320 composed of a lens 321, a shutter combined with a diaphragm for film 322, film 323 such as J135 or IX-240, a film data reading circuit 324, an optical viewfinder 325, and the like; a picture-taking system 330 composed of a lens driving circuit 331, a shutter driving circuit 332, an aperture value detecting circuit 333, a film driving circuit 334, and the like; an electronic flash system 340 composed of an electronic flash controlling circuit 341, an Xe lamp 342, and the like; a photometry circuit 351; and a distance measuring circuit 361.

In such the silver halide camera section 300, a light image obtained through the optical system 320 composed of the lens 321, the shutter combined with diaphragm for film 322 and the like, is formed on the light receiving surface of the film 323.

In this case, the lens 321 and the shutter combined with diaphragm 322 are respectively driven by the lens driving circuit 331 and the shutter driving circuit 332. Further, an aperture value of the shutter combined with diaphragm 322 is detected by the aperture value detecting circuit 333.

The lens driving circuit 331 is composed of, for example, a stepping motor, changes the lens position by the control of the CPU 100, and an optical focusing surface of an object is appropriately adjusted on the film 323. Further, the shutter driving circuit 332 optically changes the aperture value by the control of the CPU 100, or drives opening/closing of the shutter. Further, by the operation of the operation display system 310, the CPU 100 causes the film driving circuit 334 to drive feeding of the film. In this case, the CPU 100 refers to the photometric value or the distance measuring value obtained by the photometry circuit 351 or the distance measuring circuit 361.

Further, the photometric value obtained in the photometry circuit 351 is not larger than a predetermined value, the CPU 100 also refers to the distance measuring value obtained in the distance measuring circuit, and directs the electronic flash control circuit 341 to emit light.

(Basic operations of the silver halide camera equipped with an electronic viewfinder)

Herein, referring to a flow chart in FIG. 2, a series of operations of the silver halide camera equipped with an electronic viewfinder of an example of the present invention will be described.

Figure 2:
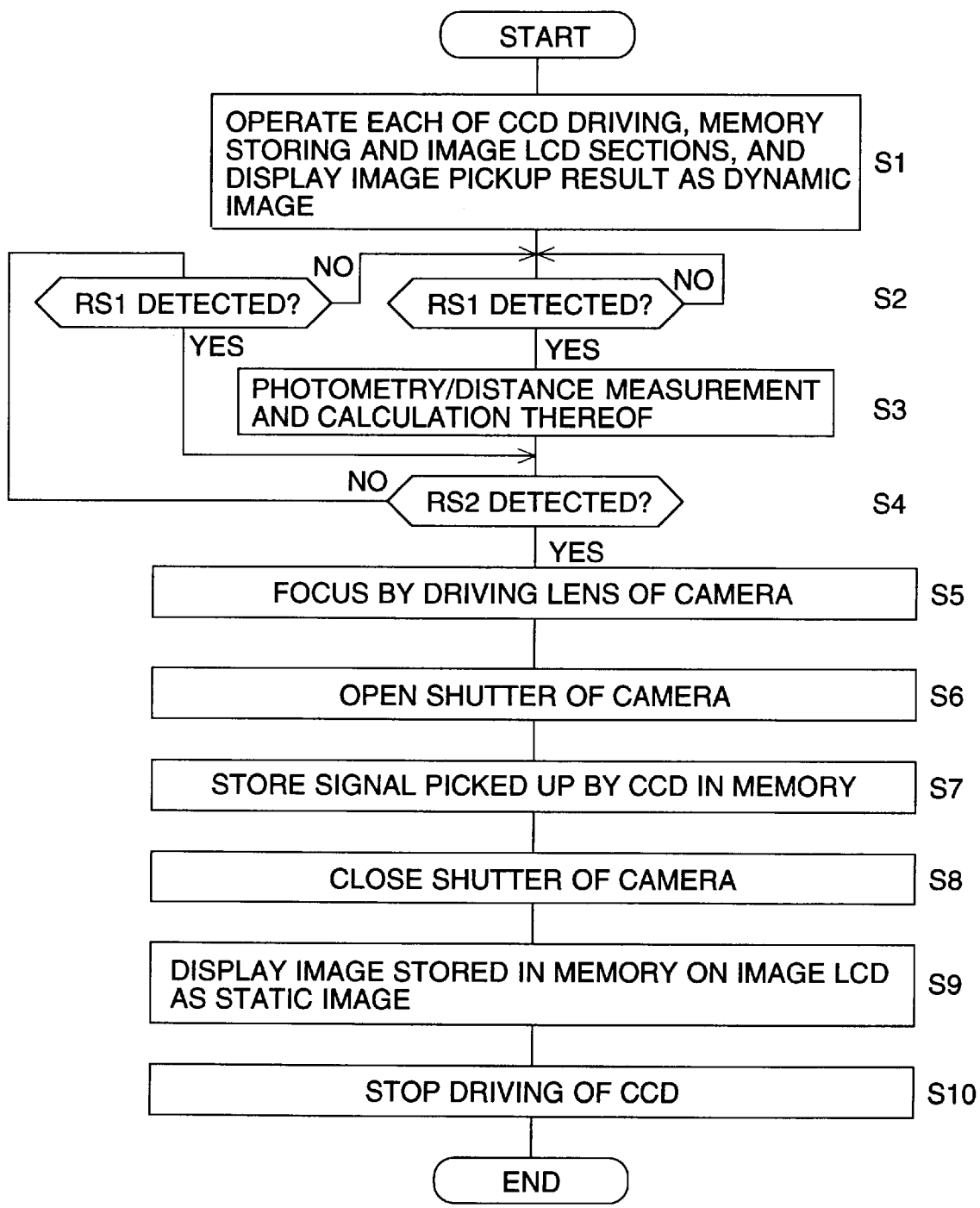
FIG. 2 is a flow chart showing operations of the silver halide camera equipped with the electronic viewfinder in the example of the present invention.

When the power source switch 311 is operated, after the CPU 100 initializes each section of the camera, the CPU 100 causes the camera to start a series of operations of driving the CCD 213, storing into and reading from the memory 263, and displaying on the image LCD 273, and to display the result of the image pick-up on the image LCD 273 as a dynamic image (S1 in FIG. 2). By the dynamic image display, the object can be confirmed before picture-taking (framing).

The CPU 100 observes the pressing condition of the release switch 312, and herein, observes the condition of RS1 of the first step of the two-step pressing type release switch 312 (S2 in FIG. 2).

When RS1 is detected, the CPU 100 directs the photometry circuit 351 and the distance measuring circuit 361 to conduct the photometry, distance measuring, and necessary calculations according to those operations (S3 in FIG. 2).

When the photometry, distance measuring, and necessary calculations have been completed, the CPU 100 observes the pressing condition of RS2 of the second step of the release switch 312 (S4 in FIG. 2). When RS2 is not detected, the CPU 100 continues the observing operation of RS1 again (S2 in FIG. 2).

Then, the picture-taking operation of the silver halide camera section 300 side is conducted. Initially, according to the distance measuring information, the lens driving circuit 331 drives the lens 321 to focus on the object (S5 in FIG. 2).

Further, according to the photometry information, the shutter driving circuit 332 opens the shutter combined with diaphragm 322 so that a predetermined aperture value can be obtained (S6 in FIG. 2). Then, at timing when the shutter is opened, an image picked up by the CCD 213 is stored in the memory 263 (S7 in FIG. 2). After the CCD image pick-up, the shutter combined with diaphragm 322 is closed by the shutter driving circuit 332, when a predetermined shutter-open time has passed (S8 in FIG. 2).

As described above, while the display of the image LCD 273 is stopped, a picture-taking operation by the silver halide camera 300 side is conducted and the result of the CCD image pick-up is stored in the memory.

When the picture-taking operation by the silver halide camera 300 side and the memory storage of the result of the CCD image pick-up have been completed, the display of the image LCD 273 and light emission of the back light 274 are started by the LCD driving circuit 272. Herein, the result of the CCD image pick-up synchronized with the picture-taking on the silver halide film is read from the memory 263, and displayed on the image LCD 273 as a static image (S9 in FIG. 2).

Thereby, the result of picture-taking on the silver halide film can be confirmed just after the picture-taking. In this connection, because the drive of the CCD 213 is not necessary at the time of the static image display, the operation of the CCD driving circuit 223 is preferably stopped (S10 in FIG. 2). Further, in parallel with the above, the CPU 100 directs the film driving circuit 334 to feed the film so that the camera stands by the next silver halide film picture-taking.

In this connection, simultaneously with the display of the static image, the CPU 100 directs the character superimposing circuit 271, at need, to display the image by superimposing data relating to the picture-taking thereon as character information. Further, the image display as the static image is continued until the start of the next film picture-taking is ready.

(The external view of the silver halide camera equipped with the electronic viewfinder)

Figure 3:
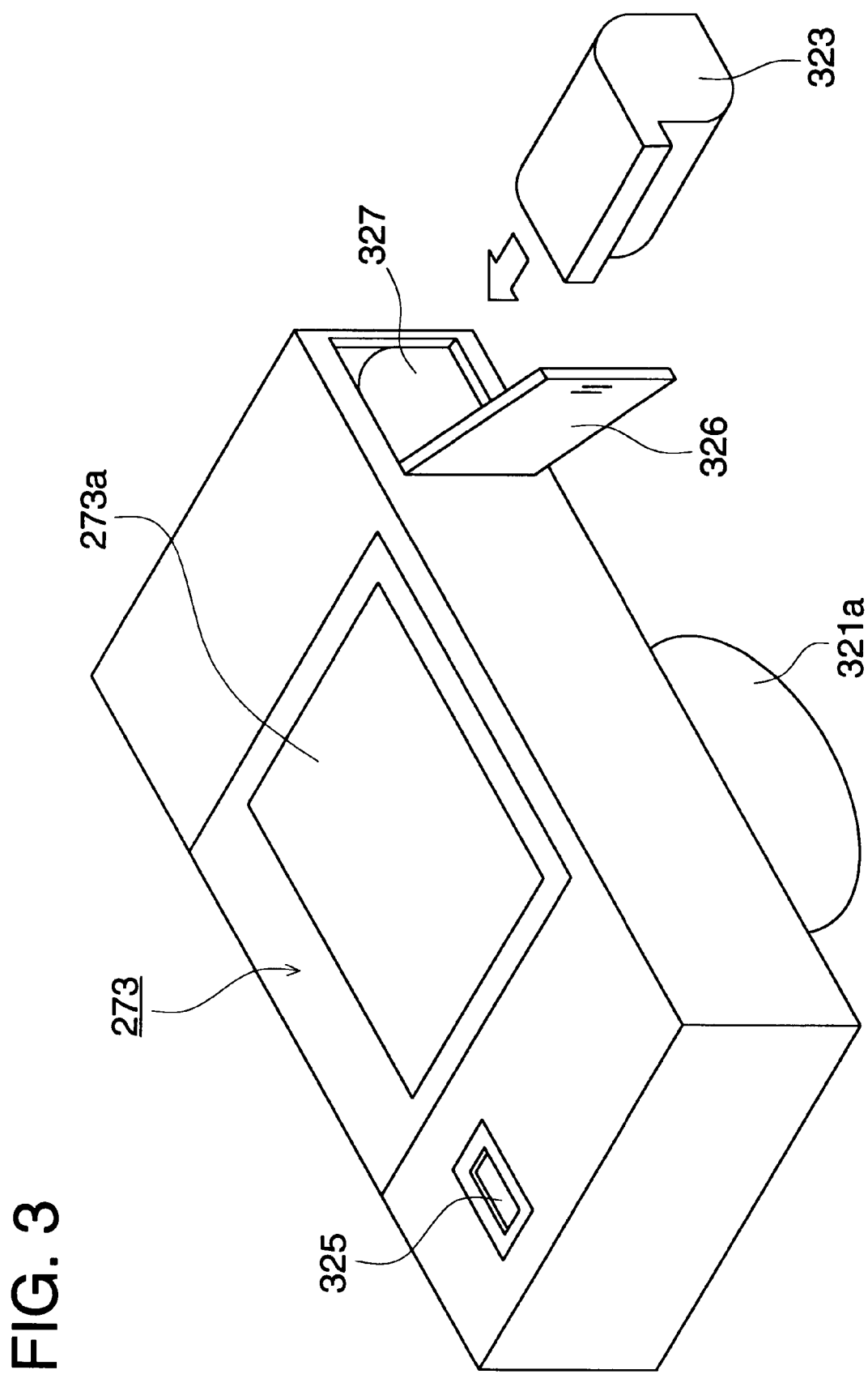
FIG. 3 is a perspective view of the external appearance when an image LCD is arranged on the rear surface of the camera main body, in the silver halide camera equipped with the electronic viewfinder of the example of the present invention.

FIG. 3 is a perspective view mainly showing the rear surface and the bottom surface of the silver halide camera equipped with the electronic viewfinder.

In FIG. 3, the image LCD 273, which is a direct-vision type image display section, is provided in the vicinity of the central portion of the rear surface of the camera main body. An optical viewfinder 325 is also provided at its side. The camera is structured such that a lid 326 provided on the bottom surface of the camera main body is opened, and the cartridge type film 323 is loaded into an internal film loading section 327. In this connection, "the direct-vision type image display section" in the present specification means the image display section which can be directly viewed at, without viewing through the optical system such as a magnification lens, or the like.

Figure 4:
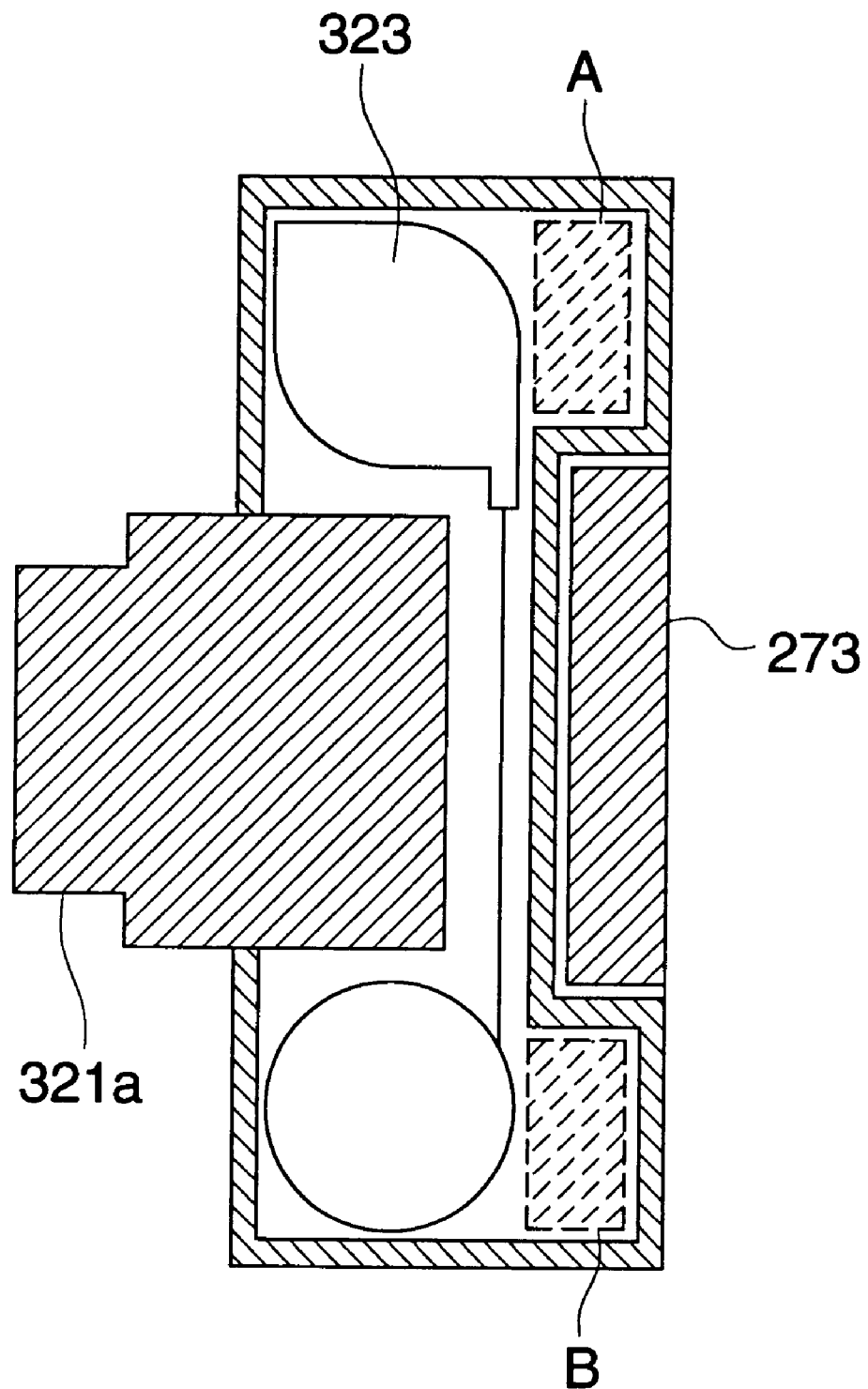
FIG. 4 is a sectional view when an image LCD is arranged on the rear surface of the camera main body, in the silver halide camera equipped with the electronic viewfinder of the example of the present invention.

When the image LCD 273 is provided on the rear surface, and the display surface 273a of the image LCD 273 forms an almost equal level to the rear surface of the camera main body, excessive space (A, B) is produced on both sides of the image LCD 273 as shown in FIG. 4. In the space A and B, circuit boards and mechanisms necessary for the electronic viewfinder section 200 are preferably arranged.

(The concrete structure, operations and effects of the silver halide camera equipped with the electronic viewfinder)

(1) The silver halide camera equipped with the electronic viewfinder as described above, has the electronic viewfinder section 200, and when the image LCD 273 is provided on the rear surface of the camera main body, the actually photographed image can be confirmed without developing or printing the film 323. Further, framing before picture-taking can easily be conducted by using the image LCD 273.

Further, the cartridge type film or the film stored in the cartridge mentioned above in the present invention implies a film stored in an APS cartridge, a 135 film stored in a film magazine, or a silver halide film stored in any other type cartridge. Specifically, the film stored in the APS is preferable.

(2) In the silver halide camera equipped with the electronic viewfinder as described in (1), the camera is structured such that the cartridge type film 323 is loaded from the bottom surface side of the camera main body along the central axis for winding up the film 323. When such the film loading mechanism is provided, it is not necessary to open/close the rear surface of the camera main body, thereby, the image display section of the electronic viewfinder means can be provided on the rear surface of the camera. Thereby, any complicated structure is not necessary, and the photographed image can be identified without developing or printing the silver halide film.

Figure 5:
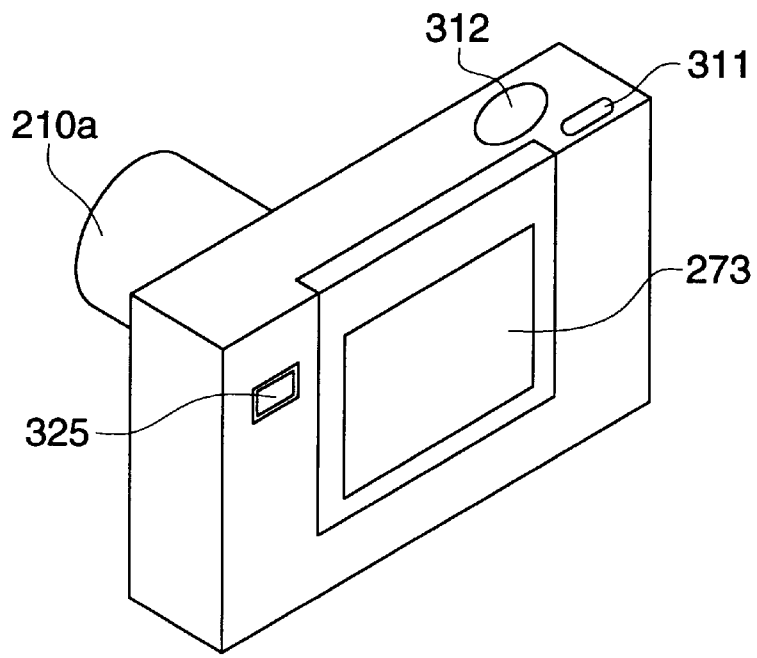
FIGS. 5(a) and 5(b) are perspective views of the external appearance when the image LCD is structured to be movable, in the silver halide camera equipped with the electronic viewfinder of the example of the present invention.
Figure 5:
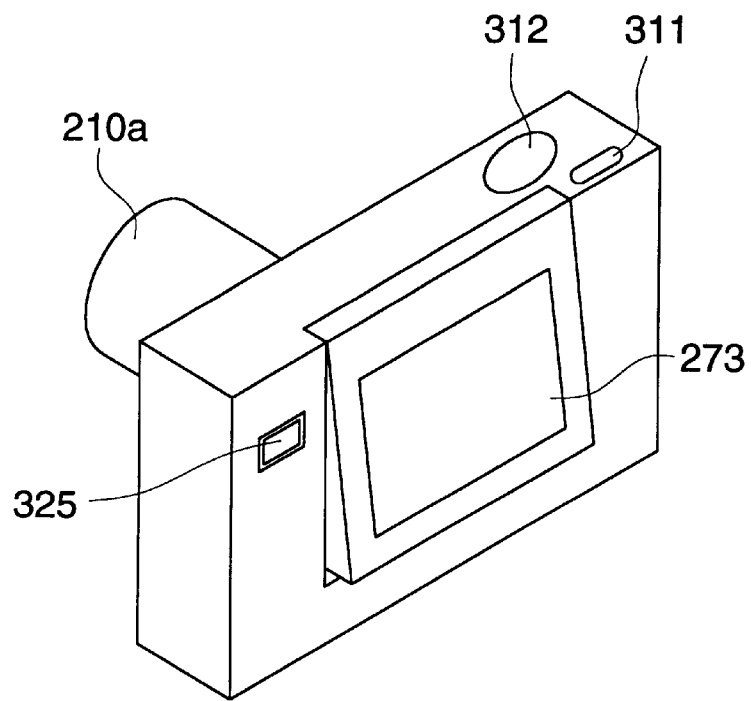

(3) FIGS. 5(a) and 5(b) are perspective views of an external view of the camera when the image LCD 273 is structured so as to be movable, in the silver halide camera equipped with the electronic viewfinder. FIG. 5(a) shows a condition that the image LCD 273 is housed, and FIG. 5(b) shows a condition that the image LCD 273 is tilted up.

Because the silver halide camera equipped with the electronic viewfinder is structured such that the image LCD 273 of the electronic viewfinder means is movable with respect to the camera main body, the photographed image can easily be identified, without developing or printing the silver halide film. Further, even in the environment in which the optical viewfinder of the silver halide camera can hardly be used (low angle picture-taking, or the like), the photographed image can be confirmed or framing before picture-taking is possible. In this connection, when the image LCD 273 is made movable, not only the tilt-up type as shown in FIG. 5(b), but also a slide-up type, or a type which is horizontally rotatable after being slid-up, may be allowable.

When the tilt-up type image LCD 273 as described above, is tilted up by 180°, the display surface 273a can also face the object side. In this case, framing can be easily identified in the case of self timer picture-taking, or release picture-taking.

In this case, a switch to detect that the image LCD 273 is tilted up by 180° may be provided, and the CPU 100 may direct the digital data circuit system 260 to reverse the displayed image upside down.

Further, when self timer picture-taking is conducted under the condition that the image LCD 273 is tilted up by 180°, the number of seconds until picture-taking may be superimposed and displayed on the image LCD 273 through the character superimposing circuit 271.

(4) Further, in the fixed type image LCD 273 and the movable type image LCD 273 as described in the above (1) to (3), the image LCD 273 may be structured so that it is detachable from the camera main body.

Because the image LCD 273 is structured such that it is detachable with respect to the camera main body, not only the photographed image can be confirmed, but also even in the environment in which the optical viewfinder can hardly be used (low angle picture-taking, or the like), or even from a position separated from the camera main body, the photographed image can be confirmed or framing before picture-taking is possible.

Figure 6:
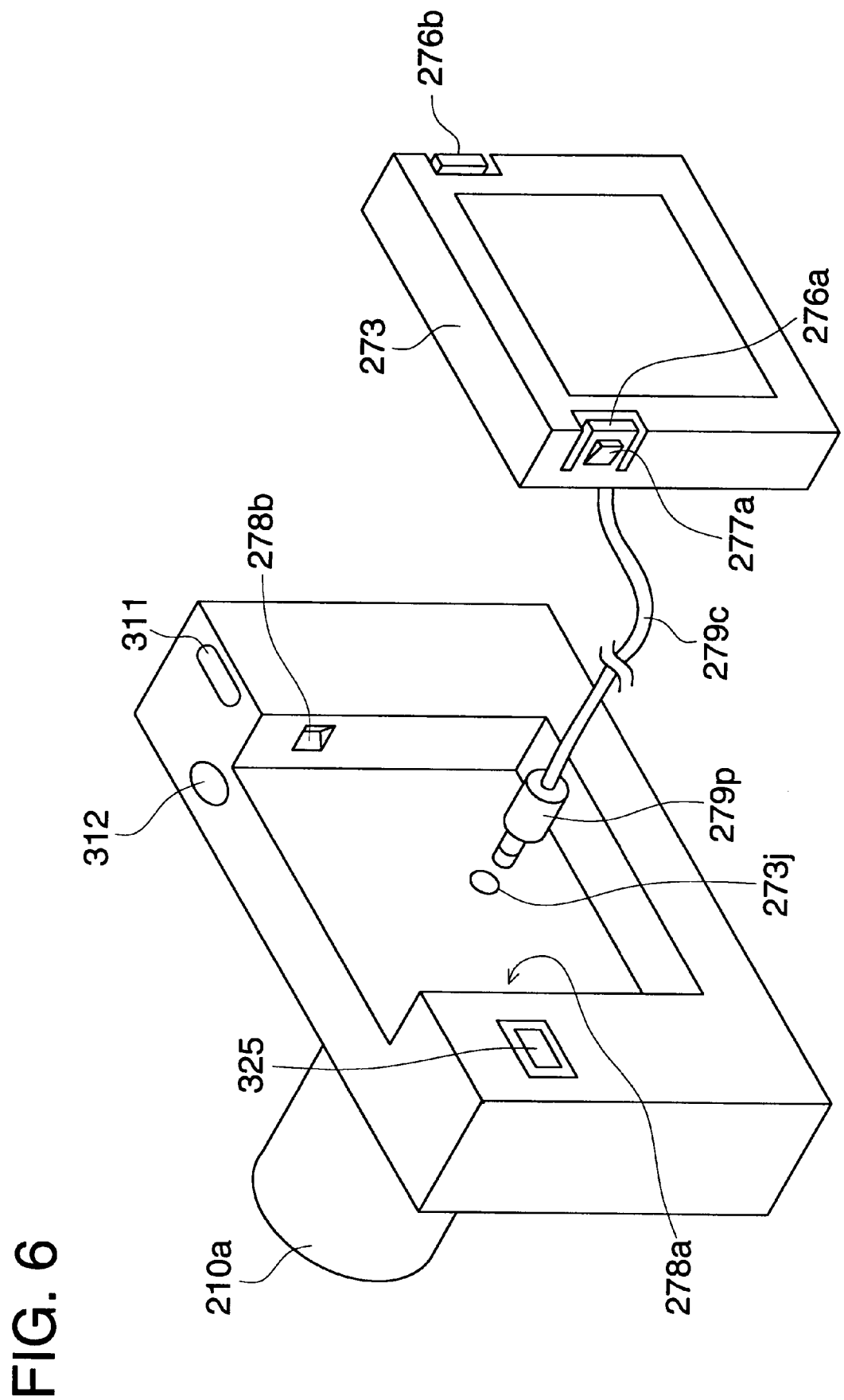
FIG. 6 is a perspective view of the external appearance when the image LCD is detachably structured, in the silver halide camera equipped with the electronic viewfinder of the example of the present invention.

In this case, as shown in FIG. 6, elastic claw portions 276a and 276b are respectively provided on side surfaces of the image LCD 273, and convex portions 277a and 277b are respectively provided toward the outside. Concave portions 278a and 278b are respectively provided at positions of the camera main body side corresponding to the convex portions. Further, a plug 273p for signal transmission (not shown in the drawings) is provided on the attached surface of the image LCD 273 which is attached to the camera main body, and a plug insertion hole (jack) 273j for signal transmission is provided on the corresponding camera main body side.

Being structured as described above, when the image LCD 273 is integrally attached to the camera main body, the image LCD 273 is held on the camera main body by engagement of the convex portions 277a, 277b with the concave portions 278a and 278b, and signal transmission is conducted by the plug 273p and the jack 273j.

Further, when claw portions 276a and 276b are bent inside, the engagement of convex portions 277a, 277b with the concave portions 278a and 278b is released, the image LCD 273 can be detached from the camera main body. In this case, when a connection cable 279c (a cable having the plug 279p and the jack 279j (not shown)) is connected between the plug 273p and the jack 273j, the signal transmission is carried out.

In this connection, the plug and jack type cable is described as an example, however, it may be replaced by various types of connectors. Further, the signal transmission may also use radio wave or infrared transmission, other than wire transmission.

(5) In the silver halide camera equipped with the electronic viewfinder of the above-described (1) to (4), the electronic viewfinder section 200 displays an image so that its angle of view is almost equal to that of the image recorded on the film 323 in the silver halide camera section 300. That is, the CPU 100 directs the lens driving circuit 221 to adjust the focal distance so that the angle of view of the lens 211 has almost equal angle of view of the lens 321 of the silver halide camera section.

In the silver halide camera equipped with the electronic viewfinder which displays an image at almost equal angle of view, conditions of picture-taking on the film can be identified without developing or printing the film 323.

(6) In the silver halide camera equipped with the electronic viewfinder of the above-described (1) to (5), the image LCD 273 refers to aspect information of each image specified in the silver halide camera section 300, and displays the image in a corresponding aspect ratio.

That is, because the aspect ratio at printing is specified as H, C, P at picture-taking, the CPU 100 changes a reading range from the memory 263 corresponding to the aspect ratio information, and adjusts the aspect ratio of the image displayed on the image LCD 273.

In the silver halide camera equipped with the electronic viewfinder, because an image is displayed also in the electronic viewfinder section 200, corresponding to the aspect ratio of each image specified in the silver halide camera section 300, a condition of a print obtained by picture-taking onto the film can be confirmed without developing or printing the film.

(7) In the silver halide camera equipped with the electronic viewfinder described in (6), when an image is displayed on the image LCD 273 corresponding to the aspect ratio specified in the silver halide camera section 300, it is preferable that the image is displayed by adjusting the image magnification so that the image has the maximum area within the range in which the image LCD 273 can display the image.

Incidentally, the image LCD 273 has the aspect ratio of length 3: width 4 which is the same as that of the conventional television receiver or the computer display. In contrast to this, the aspect ratio specified in the silver halide camera section 300 is 9:16, 2:3, and 1:3, in the case of IX-240 film. Accordingly, in each aspect ratio, the reading from the memory 263 is controlled by the direction from the CPU 100 so as to use the image LCD 273 at the maximum.

Figure 7A:
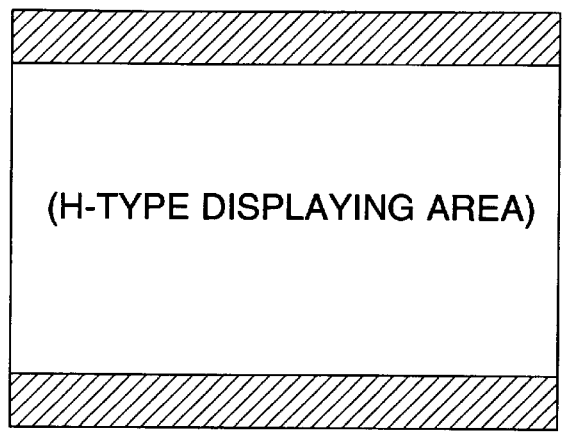
FIGS. 7(a), 7(b) and 7(c) are illustrations showing conditions of the display on the image LCD of the silver halide camera equipped with the electronic viewfinder of the example of the present invention.
Figure 7B:
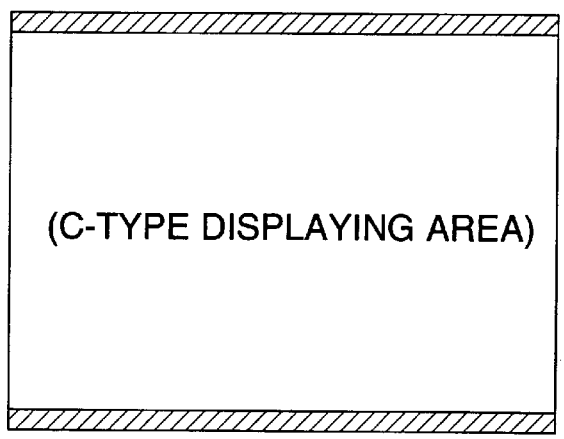
Figure 7C:
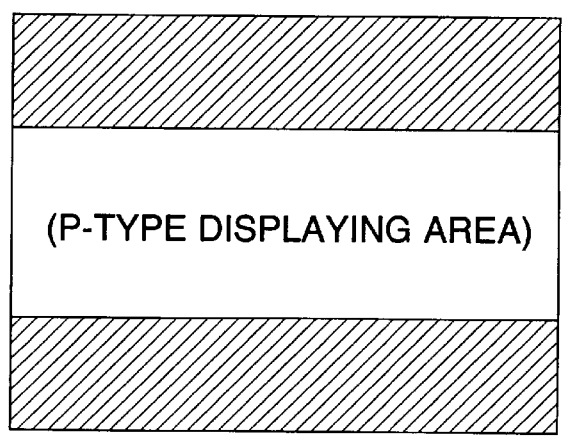
Figure 8A:
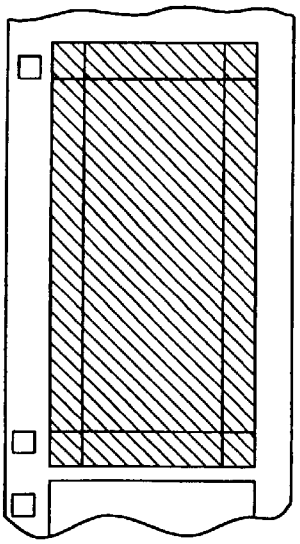
FIGS. 8(a), 8(b) and 8(c) are illustrations showing conditions of aspect ratio specification on the film when a picture is taken by the silver halide camera.
Figure 8B:
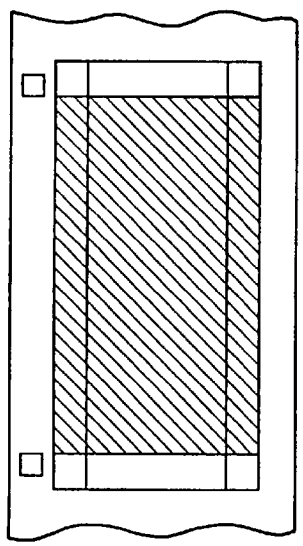
Figure 8C:
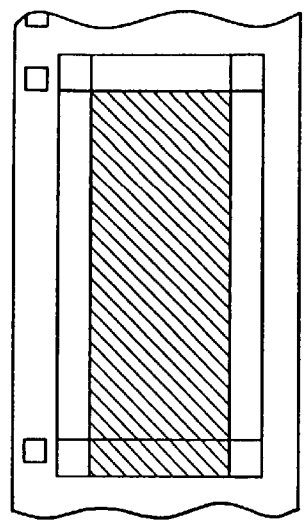
Figure 9:
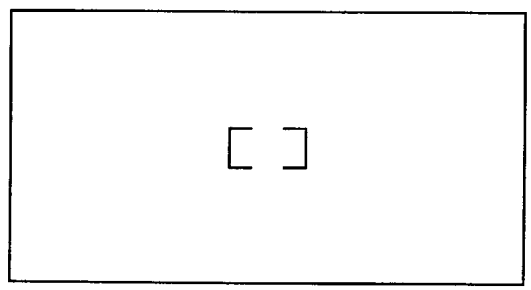
FIGS. 9(a), 9(b) and 9(c) are illustrations showing conditions of a viewfinder corresponding to aspect ratio specification when a picture is taken by the silver halide camera.
Figure 9:
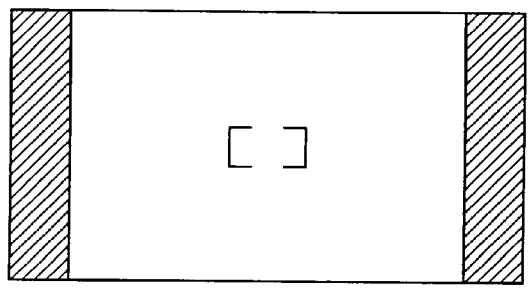
Figure 9:
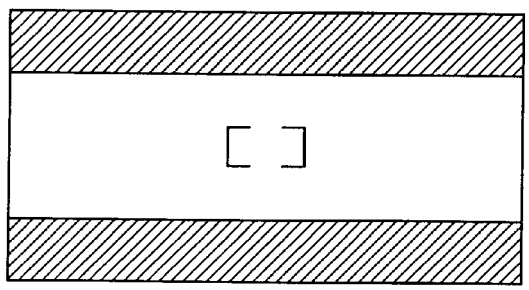

This situation is shown in FIGS. 7(a), 7(b) and 7(c). Each external frame portion in FIGS. 7(a), 7(b) and 7(c), shows the displaying area of the image LCD 273. Herein, FIG. 7(a) shows the situation of the display when the H-type display is indicated in the silver halide camera section 300, and a hatched portion shows an area which is not used for the display. FIG. 7(b) shows the situation of the display when the C-type display is indicated in the silver halide camera section 300, and a hatched portion shows an area which is not used for the display. FIG. 7(c) shows the situation of the display when the P-type display is indicated in the silver halide camera section 300, and a hatched portion shows an area which is not used for the display.

Figure 10:
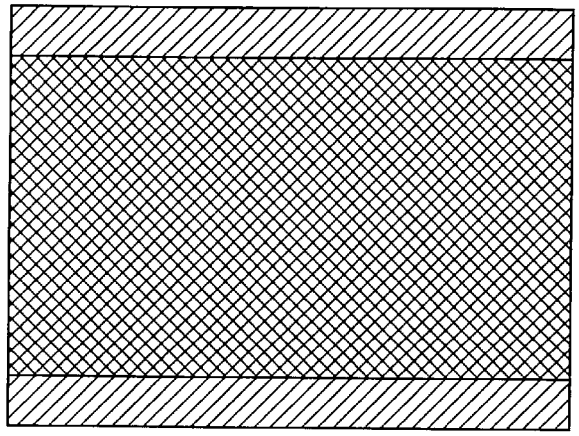
FIGS. 10(a), 10(b) and 10(c) are illustrations showing conditions of display of the image LCD corresponding to aspect ratio specification when a picture is taken by the silver halide camera.
Figure 10:
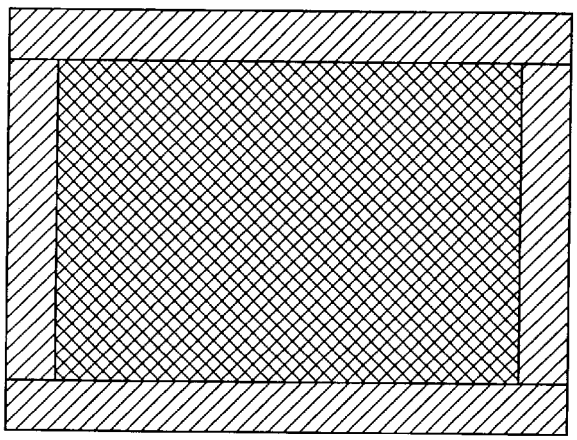
Figure 10:
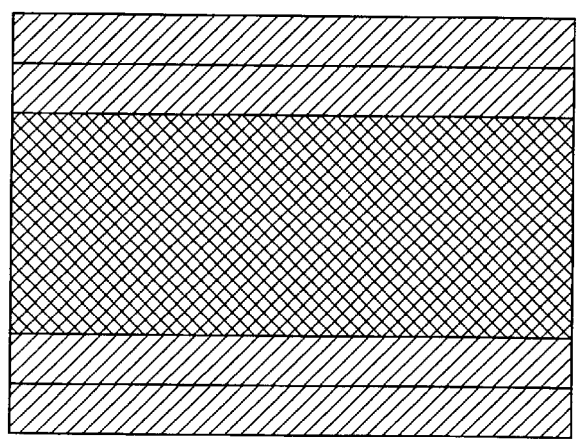

That is, when either the length or the width is used without uselessness, the image LCD 273 is used to the maximum in each aspect ratio. In this case, it can be seen that, comparing to the in FIGS. 10(a), 10(b) and 10(c), the image magnification is changed in the C-type display and the useless displaying area is reduced. In this connection, there is a possibility that the displaying area is different from those shown in the drawings, in the relationship between the aspect ratio of the image LCD 273 and that specified in the silver halide camera section 300, however, the useless displaying area can be suppressed in any case.

(8) In the silver halide camera equipped with the electronic viewfinder described in (7), when an image is displayed on the image LCD 273 so that it has the maximum area, corresponding to the aspect ratio specified in the silver halide camera section 300, it is preferable that the image magnification is adjusted using image processing such as electronic zooming and the image is displayed.

That is, in the image display on the image LCD 273, because, in many cases, a pixel of image data stored in the memory 263 and a pixel of the image LCD 273 correspond to each other by 1:1, the image magnification is adjusted by the electronic zooming by image processing in the signal processing circuit 262.

In this case, by the direction from the CPU 100, the image processing circuit 262 is controlled and the image magnification is adjusted so that it corresponds to the aspect ratio specified in the silver halide camera section 300.

Thereby, conditions of picture-taking on the film and conditions of a print can be confirmed without developing and printing the film, and the displaying area of the image display section can be used effectively.

(9) In the silver halide camera equipped with the electronic viewfinder described in (7), when an image is displayed on the image LCD 273 so that it has the maximum area, corresponding to the aspect ratio specified in the silver halide camera section 300, the image magnification can be adjusted by using the variable magnification function of the optical system 210 of the electronic viewfinder section 200, and thereby, the image can also be displayed.

That is, in the image display on the image LCD 273, because, in many cases, a pixel of image data stored in the memory 263 and a pixel of the image LCD 273 correspond to each other by 1:1, the display is adjusted by previously obtaining the predetermined image magnification by the optical system 210.

In this case, by the direction from the CPU 100, the image magnification is adjusted by controlling the lens driving circuit 221 so that the image magnification corresponds to the aspect ratio specified in the silver halide camera section 300.

Thereby, conditions of picture-taking on the film and conditions of a print can be confirmed without developing and printing the film, and the displaying area of the image display section can be used effectively.

(The principle of exposure control of the silver halide camera equipped with the electronic viewfinder)

Generally, the exposure calculation of the camera is conducted based on exposure value (EV).

Herein, EV is expressed by the following relationship:

$$EV=AV+TV=BV+SV \qquad (1)$$

Where, AV: the APEX value of exposure value, TV: the APEX value of the shutter speed, BV: the APEX value of the object brightness, and SV: the APEX value of the film sensitivity. An example of the APEX value is shown in FIG. 11.

In this case, the exposure calculation of the silver halide camera is expressed as follows:

$$EVfilm=AVfilm+TVfilm=BVfilm+Svfilm \qquad (2)$$

In the same manner, the exposure calculation of the electronic viewfinder is expressed as follows:

$$Evccd=Avccd+TVccd=BVccd+SVccd+GV \qquad (3)$$

Herein, AV, TV and BV are the same as described above, however, SVccd is the APEX value of the CCD sensitivity, and GV is the APEX value of an amplification factor (gain) for the image pick-up result of CCD.

In this case, the object brightness is the same as in the cases of the silver halide camera and the electronic viewfinder, and when BVfilm=BVccd, the following relationship is obtained. By the above relationships (2) and (3), $$AVfilm+TVfilm-SVfilm=AVccd+TVccd-SVccd-GV \qquad (4)$$

Accordingly, the APEX value GV of the amplification factor can be expressed by the following relationship:

$$GV=TVccd-TVfilm+AVccd-AVfilm-SVccd+Svfilm \qquad (5)$$

Herein, in order to make the shutter speed of the silver halide camera equal to that of the electronic viewfinder, the condition of TVccd=TVfilm may be established.

Accordingly, it means that the exposure calculation may be conducted so that the following relationship is attained:

$$GV=AVccd-AVfilm-SVccd+SVfilm \qquad (6)$$

Herein, an example of the APEX value of GV is as shown in FIG. 12. In this connection, in this APEX value, because it has no meaning that the amplification factor is made less than 1 after a photoelectric conversion amount has saturated, the GV less than 0 (magnification is less than 1) is not set. Further, because a noise of the image becomes conspicuous even if a small signal having a low S/N value is amplified, the GV not less than 3 is not set in the present example.

(An example of the exposure control of the silver halide camera equipped with the electronic viewfinder)

Figure 13:
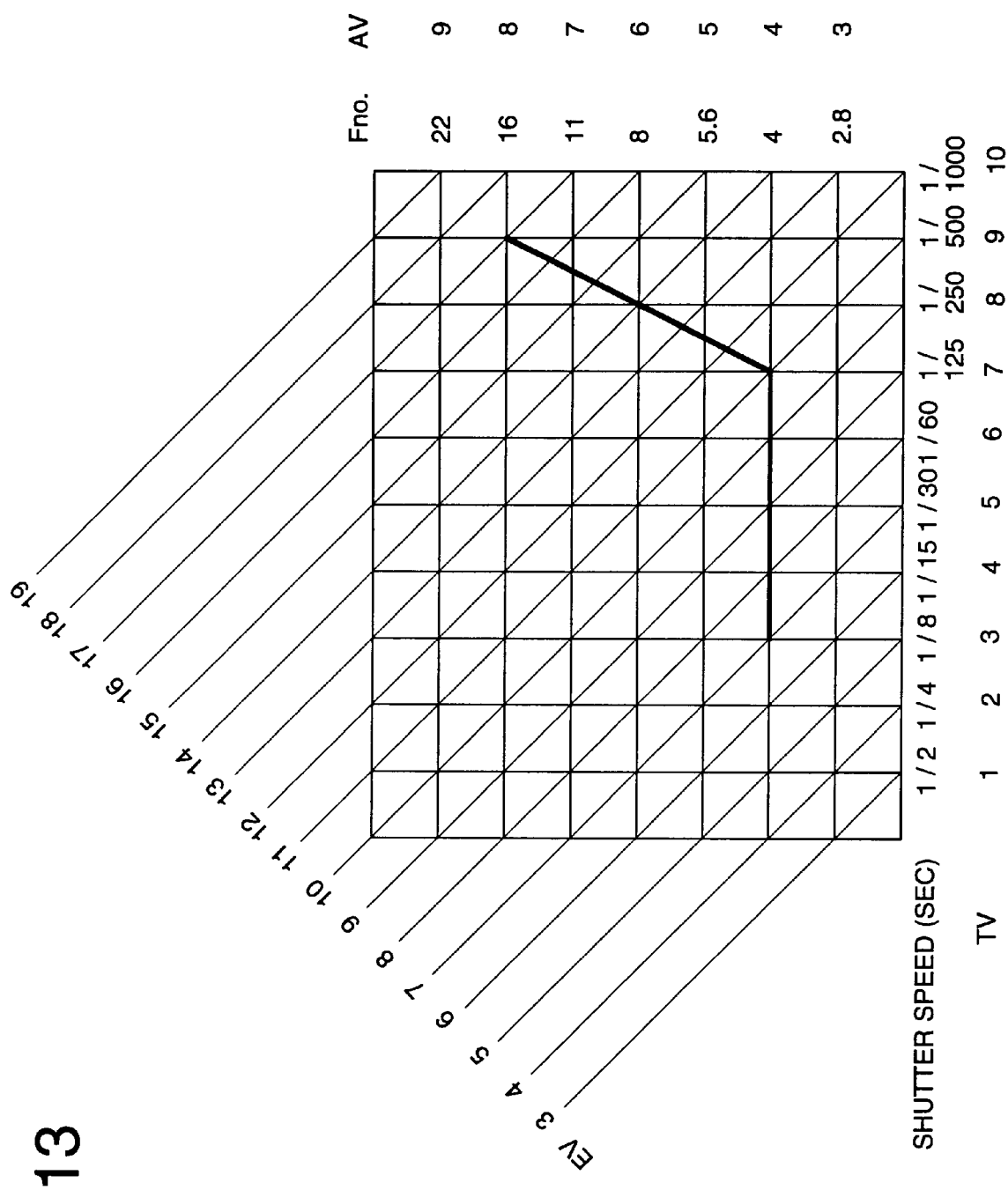
FIG. 13 is a program diagram for the exposure control of the silver halide camera section side in the silver halide camera equipped with the electronic viewfinder of the example of the present invention.

FIG. 13 is a program diagram for the exposure control of the CPU 100 in the silver halide camera 300, when the shutter 322 combined with the diaphragm is used which is structured by an iris diaphragm in which the aperture value is continuously changed and the aperture value at open aperture is F4.

Figure 14:
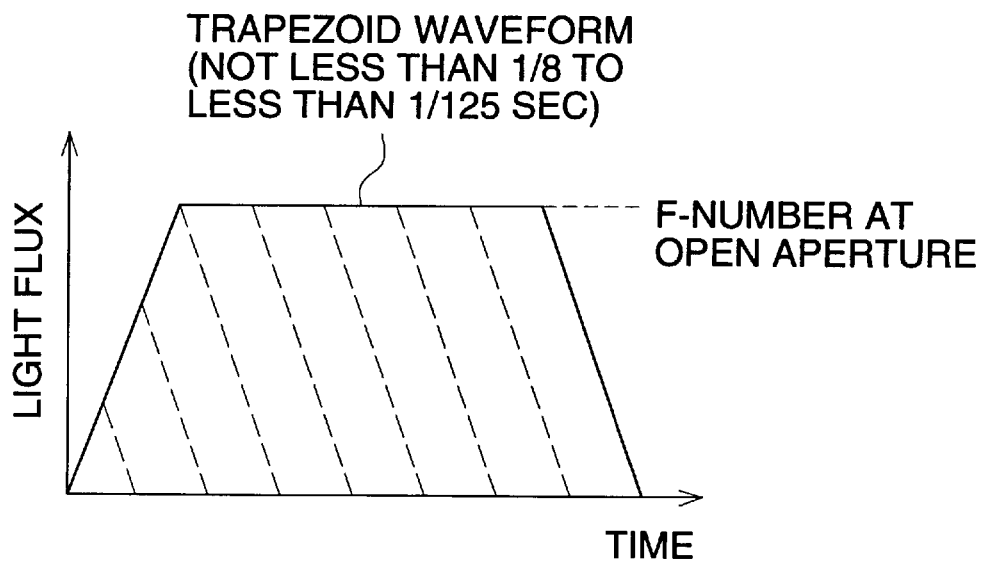
FIGS. 14(a), 14(b) and 14(c) are time charts showing conditions when a shutter combined with a diaphragm of the silver halide camera section is driven.
Figure 14:
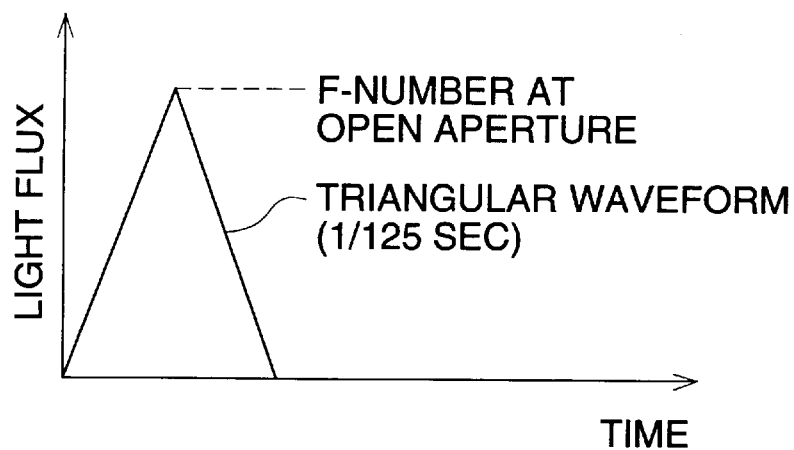
Figure 14:
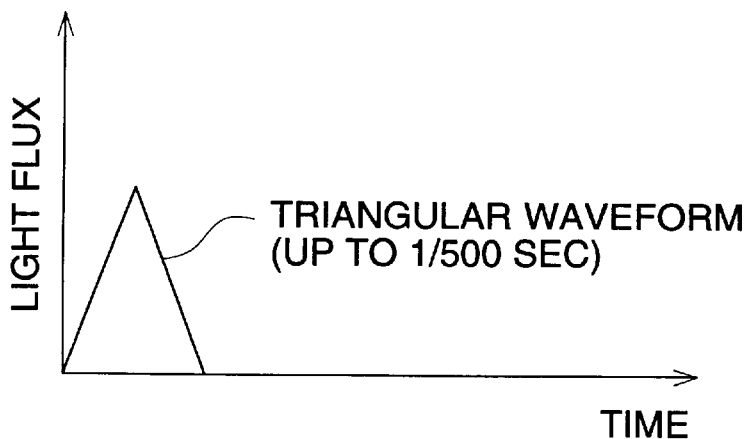

The relationship between the shutter opening/closing time and the light flux in the shutter combined with the diaphragm 322 is as follows: movement at middle and low speed (for example, a longer time side than 1/125 sec) is shown as a trapezoid waveform (FIG. 14(*a*)) and the movement at high speed (higher than 1/125 sec) is shown as a triangular waveform (FIGS. 14(*b*) and 14(*c*)) because the opening movement and the closing movement overlap each other.

In the shutter combined with the diaphragm 322 used in the present example, the trapezoid waveform and the triangular waveform are switched to each other at the shutter speed of 1/125 sec. (FIG. 14(*b*)), which is a border between the two waveforms.

On the other hand, the diaphragm 212 of the electronic viewfinder section 200 is a diaphragm whose aperture value is changed stepwise, and a two-step switching type diaphragm in which aperture value can be switched to F4 and F11, is used in the present example.

Further, as the shutter in the electronic viewfinder section 200, the electronic shutter of the CCD 213 is used, and the sensitivity of the CCD 213 is equivalent to ISO 100 (SVccd=5).

EXAMPLE OF CONDITION 1

Figure 15:
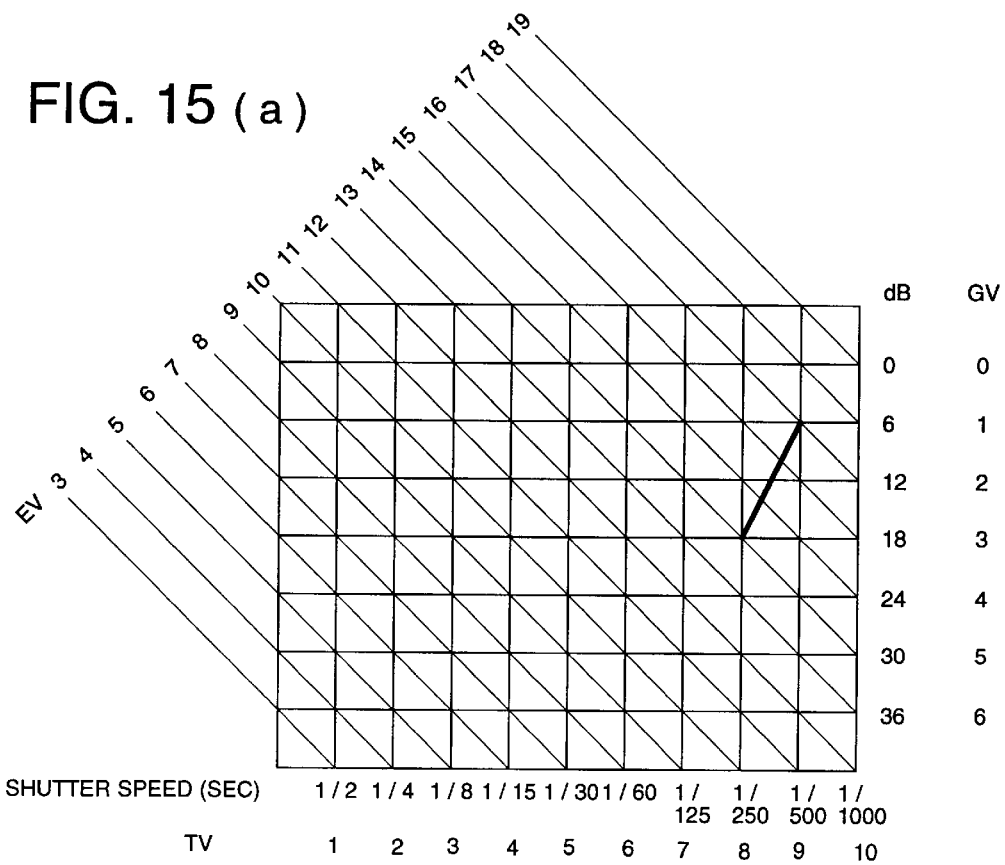
FIGS. 15(a) and 15(b) are program diagrams relating to the control of an electronic viewfinder section when the film having the sensitivity of ISO 400 is used in the silver halide camera section, in the silver halide camera equipped with the electronic viewfinder of the example of the present invention.
Figure 15:
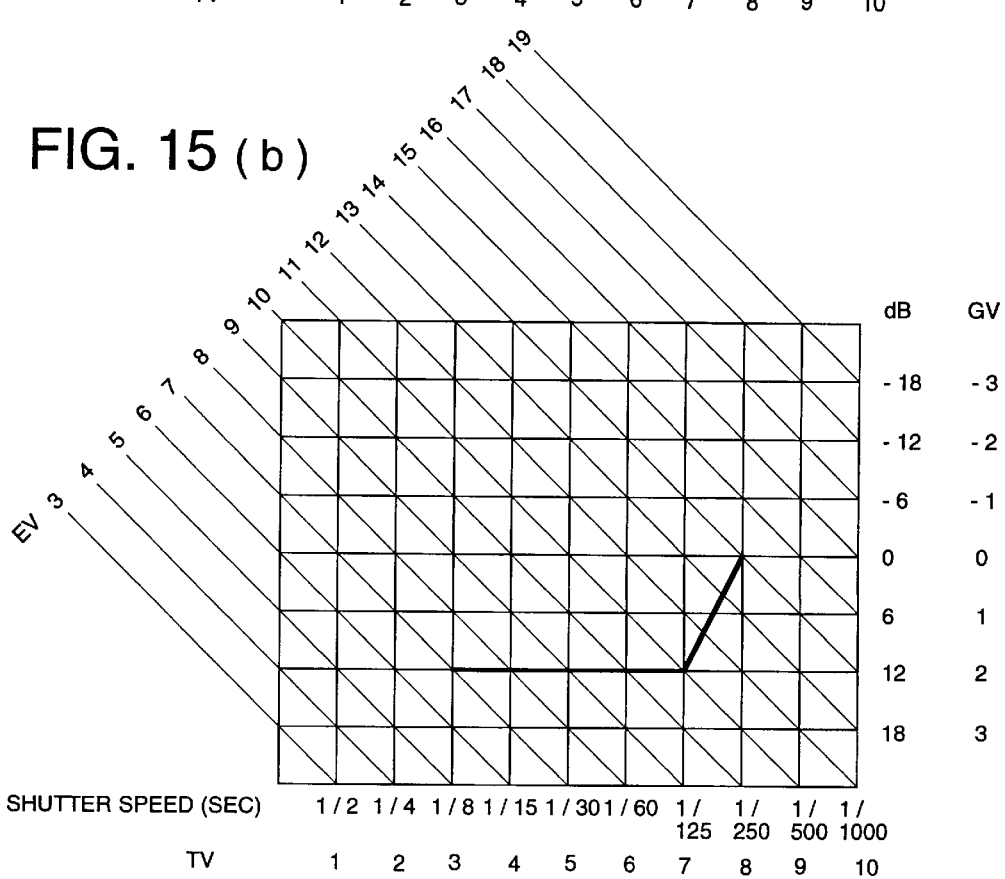

Program diagrams relating to the control of the electronic viewfinder section 200 when the film having the sensitivity of ISO 400(SVfilm=7) is used in the silver halide section 300 under the condition described above, are shown in FIGS. 15(*a*) and 15(*b*).

Herein, because the aperture value is F11 (AVccd=7) in the program diagram shown in FIG. 15(a), and when this value is substituted into the equation (6), the following relationship is obtained:

$$GV=7-AVfilm-5+7=-AVfilm+9 \quad (7)$$

Herein, when a line is drawn within the range of the condition of $3 \geq GV \geq 0$, it can be seen that the shutter speed of the electronic viewfinder section 200 can be synchronized with that of the silver halide camera 300 from 1/250 sec. to 1/500 sec. at F11.

Further, in the program diagram shown in FIG. 15(b), the F-number is F4 (AVccd=4), and when this value is substituted into the equation (7), the following relationship is obtained:

$$GV=4-AVfilm-5+7=-AVfilm+6 \quad (8)$$

Herein, when a line is drawn within the range of the condition of $3 \geq GV \geq 0$, it can be seen that the shutter speed of the electronic viewfinder section 200 can be synchronized with that of the silver halide camera 300 from the low speed to 1/250 sec. at F4.

EXAMPLE OF CONDITION 2

Program diagrams relating to the control of the electronic viewfinder section 200 when the film having the sensitivity of ISO 100(SVfilm=5) is used in the silver halide section 300 under the condition described above, are shown in FIGS. 16(a) and 16(b).

Figure 16:
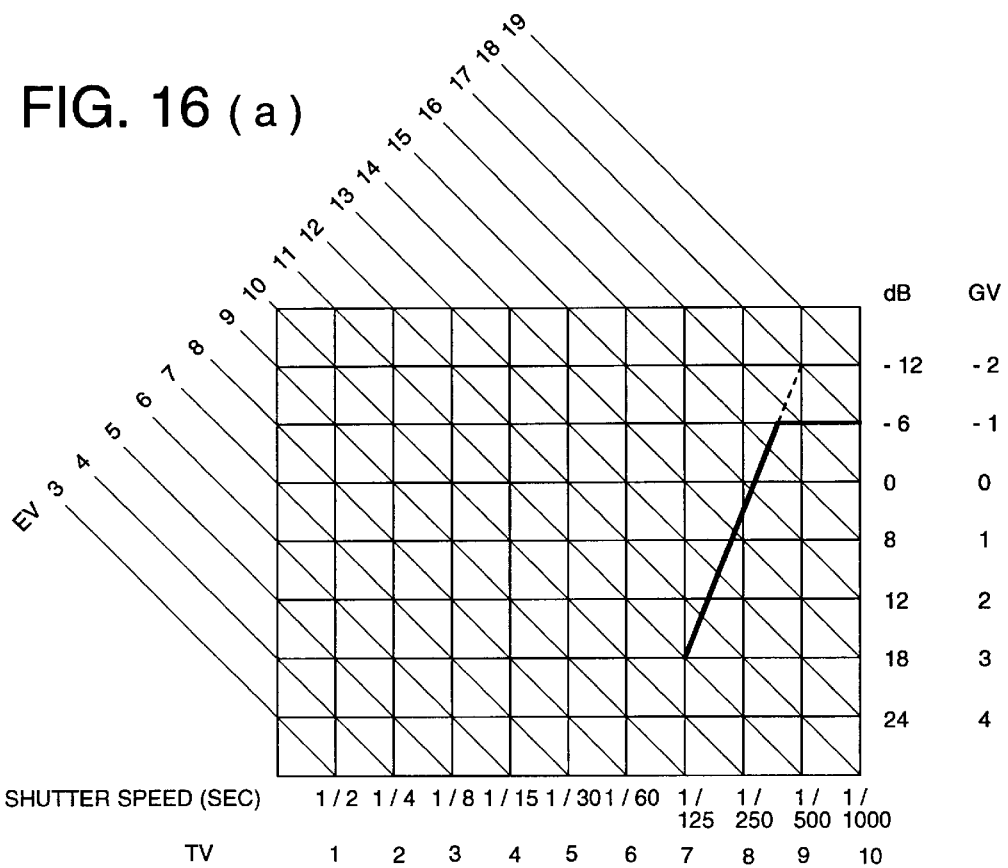
FIGS. 16(a) and 16(b) are program diagrams relating to the control of an electronic viewfinder section when the film having the sensitivity of ISO 400 is used in the silver halide camera section, in the silver halide camera equipped with the electronic viewfinder of the example of the present invention.
Figure 16:
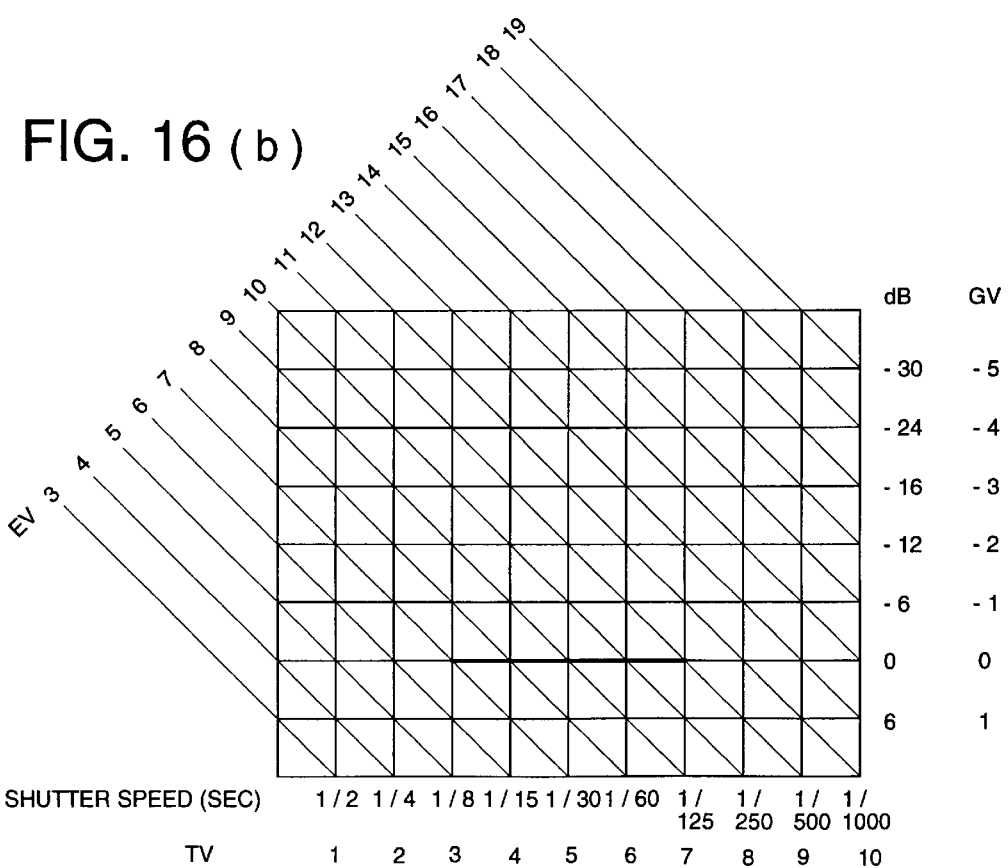

Herein, because the aperture value is F11 (AVccd=7) in the program diagram shown in FIG. 16(a), and when this value is substituted into the equation (6), the following relationship is obtained:

$$GV=7-AVfilm-5+5=-AVfilm+7 \quad (9)$$

Herein, when a line is drawn within the range of the condition of $3 \geq GV \geq 0$, it can be seen that the shutter speed of the electronic viewfinder section 200 can be synchronized with that of the silver halide camera 300 from 1/125 sec. to 1/350 sec. at F11.

In this connection, the shutter speed of the electronic viewfinder section 200 can not be synchronized with that of the silver halide camera section 300 from 1/350 sec. to 1/500 sec. (shown by a dashed line), therefore, it is necessary to increase the shutter speed of the electronic viewfinder section 200 than that of the silver halide camera section 300.

Further, in the program diagram shown in FIG. 16(b), the F-number is F4 (AVccd=4), and when this value is substituted into the equation (6), the following relationship is obtained:

$$GV=4-AVfilm-5+5=-AVfilm+4 \quad (10)$$

Herein, when a line is drawn within the range of the condition of $3 \geq GV \geq 0$, it can be seen that the shutter speed of the electronic viewfinder section 200 can be synchronized with that of the silver halide camera 300 from the low speed to 1/125 sec. at F4.

As shown by the conditions 1 and 2, even when the number of steps of aperture value of the electronic viewfinder section 200 side is smaller than that of the silver halide camera section 300 side, or the maximum aperture value or the minimum aperture value of both sections are not equal to each other, the shutter speed can coincide with each other covering the wide range, by adjusting the magnification factor (gain) of the image pick-up signal so that the above equation (6) can be satisfied.

Further, when the maximum aperture value and the minimum aperture value of the diaphragm 212 of the electronic viewfinder section 200 side are determined so that the shutter speed of the electronic viewfinder 200 side can widely coincide with that of the silver halide camera 300 side within the range of the commonly used film sensitivity (ISO 100–400), the more effective operation can be conducted.

In this connection, even if the film having the sensitivity except the above described film sensitivity, is used, when the magnification factor (gain) of the image pick-up signal is adjusted so that the above equation (6) can be satisfied, the shutter speed of the electronic viewfinder section 200 side can widely coincide with that of the silver halide camera section 300.

(Operations of the silver halide camera equipped with the electronic viewfinder)

Herein, referring to a flow chart in FIG. 17, a series of operations of the silver halide camera equipped with the electronic viewfinder relating to another example of the present invention will be described.

Figure 17:
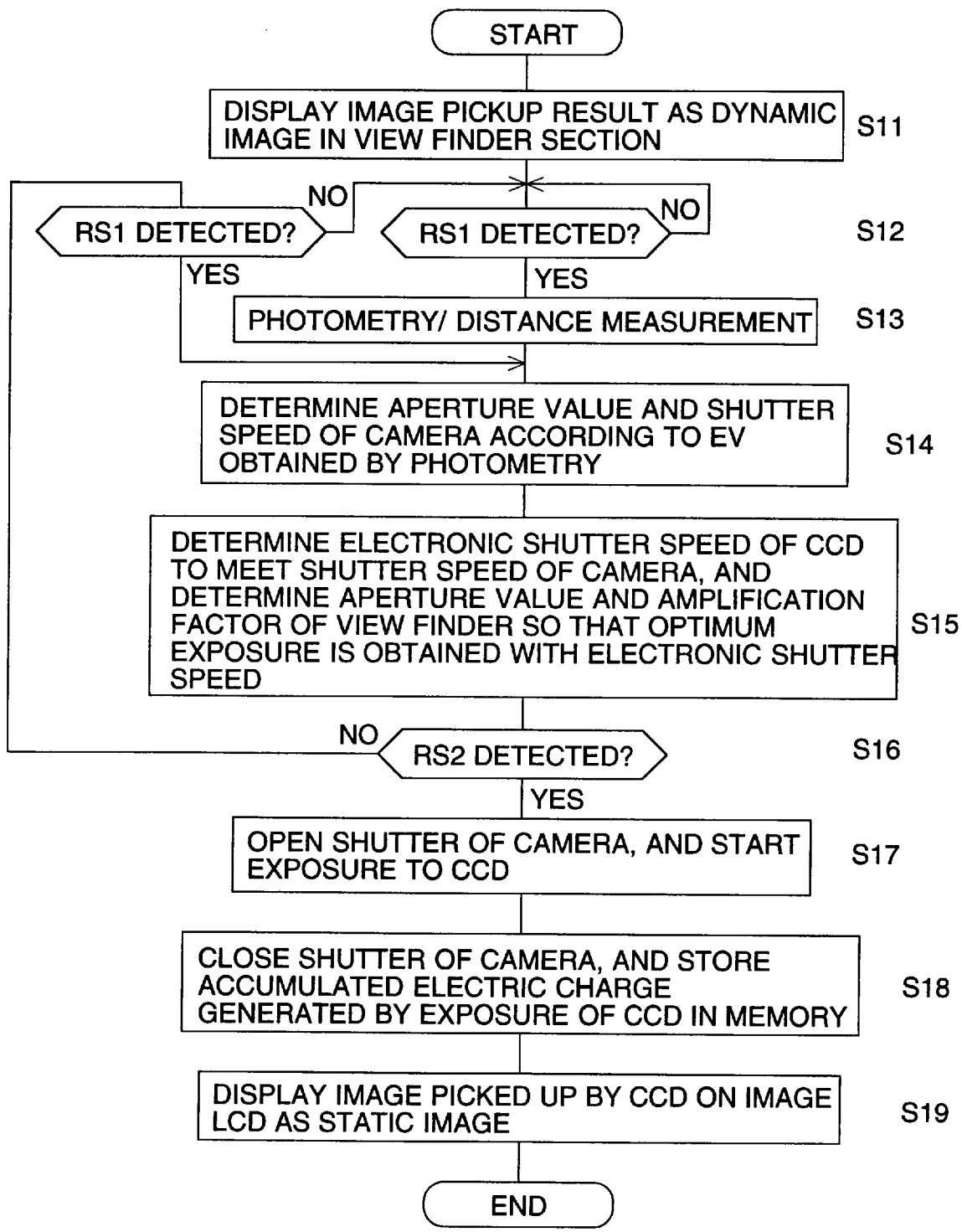
FIG. 17 is a flow chart showing operations of the entire body of the silver halide camera equipped with the electronic viewfinder of another example of the present invention.

When the power source switch 311 is operated, the CPU 100 starts a series of operations of driving of the CCD 213, storing into and reading from the memory 263, and the display of the image LCD 273 after the CPU 100 has initialized each section, and the image pick-up result by the CCD 213 is displayed on the image LCD 273 as the dynamic image (S11 in FIG. 17). By this dynamic image display, the object can be confirmed before picture-taking.

The CPU 100 observes the pressing condition of the release switch 312, and herein, the CPU 100 observes S1 of the first step of the two-step pressing type release switch 312 (S12 in FIG. 17).

When S1 is detected, the CPU 100 directs the photometry circuit 351 and the distance measuring circuit 361 to conduct photometry, distance measurement, and necessary calculation based on these operations (S13 in FIG. 17).

Then, the CPU 100 determines the F-number and the shutter speed of the silver halide picture-taking side from the exposure value obtained from photometry, according to the AE program or the like (S14 in FIG. 17).

The CPU 100 determines the aperture value of the diaphragm for CCD 212 and the amplification factor of the AGC circuit 250 so that the optimum exposure can be obtained when the CCD 213 is driven at the same electronic shutter speed as the shutter speed of the silver halide picture-taking side (S15 in FIG. 17).

When necessary calculations of the silver halide picture-taking side and the electronic viewfinder side as described above have been completed, the CPU 100 observes pressing condition of the RS2 of the second step of the release switch 312 (S16 in FIG. 17). When RS2 is not detected, the CPU 100 continues the operation to observe RS1 again (S12 in FIG. 17).

After RS2 has been detected, the shutter combined with the diaphragm 322 of the silver halide camera section 300 side is opened, and in parallel to that, an electric charge discharging operation for the electronic shutter by the CCD driving circuit 223 is stopped and electric charge accumulation (exposure) is started (S17 in FIG. 17).

After predetermined exposure time (shutter time) has passed, the CPU 100 directs each section to close the shutter combined with the diaphragm 322 for the film and complete the film exposure, and simultaneously, to stop the electric charge accumulation of the CCD 213 and move the electric charge to the memory (S18 in FIG. 17).

As described above, when the film picture-taking and the CCD image pick-up are completed, the CPU 100 directs each section of the electronic viewfinder section 200 to store image data picked-up at the same shutter speed as that of the silver halide side in the memory 263, freeze it, and display it continuously on the image LCD 273 (s19 in FIG. 17).

In parallel with that, the CPU 100 directs the film driving circuit 334 to feed the film and to charge the shutter combined with the diaphragm 322, so that the camera is ready for the next film picture-taking.

In this connection, together with the image display of the static image, the CPU 100 directs the character superimposing circuit 271 to superimpose data relating to the picture-taking on the image as character information at need, and to display the image. Further, the image display as the static image is continued until the next film picture-taking is ready.

In the silver halide camera equipped with the electrostatic viewfinder as described above, when (1) the number of steps of the aperture value of the electronic viewfinder section 200 side is smaller than that of aperture value of the silver halide camera 300, and (2) the maximum aperture value or the minimum aperture value of the electronic viewfinder section 200 does not coincide with that of the silver halide camera section 300, the shutter speed of the electronic viewfinder section 200 can widely coincide with that of the silver halide camera 300 by adjusting the amplification factor (gain) of the image pick-up signal so that the equation (6) can be satisfied.

Thereby, a picture can be taken at the same shutter speed as that of the silver halide film side and that of the CCD side, and therefore, the method of use such as confirmation of the photographed condition of the quickly moving object, and confirmation of blurred condition, is available.

Further, when the maximum aperture value and the minimum aperture value of the diaphragm 212 of the electronic viewfinder section 200 side are determined so that the shutter speed of the electronic viewfinder 200 side can widely coincide with that of the silver halide camera 300 side within the range of the commonly used film sensitivity (ISO 100–400), the more effective operation can be conducted.

Further, even if a step-type diaphragm mechanism is not provided on the electronic viewfinder section 200, the shutter speed of the CCD side can coincide with that of the silver halide film side within a predetermined range by adjusting the amplification factor of the image pick-up signal.

(Operations of the silver halide camera equipped with the electronic viewfinder)

Referring to a flow chart in FIG. 18, a series of operations of the silver halide camera equipped with the electronic viewfinder of still another example of the present invention will be described below.

Figure 18:
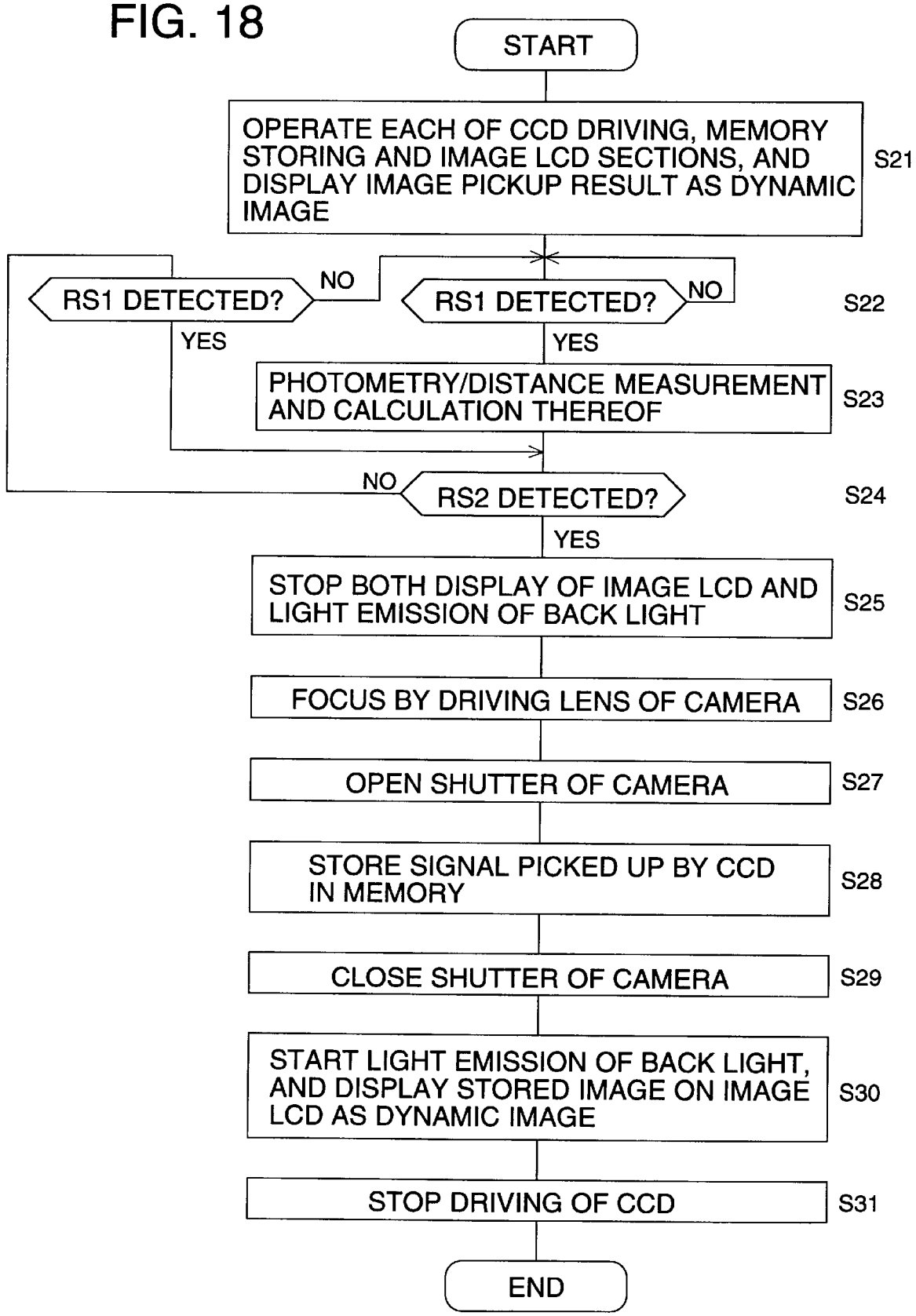
FIG. 18 is a flow chart showing operations of the silver halide camera equipped with the electronic viewfinder of another example of the present invention.

When the power source switch 311 is operated, after the CPU 100 has initialized each section, the CPU 100 starts a series of operations of driving of the CCD 213, storing into and reading from the memory 263, and the display of the image LCD 273, and the image pick-up result by the CCD 213 is displayed on the image LCD 273 as the dynamic image (S21 in FIG. 18). By this dynamic image display, the object can be confirmed before picture-taking.

The CPU 100 observes the pressing condition of the release switch 312, and herein, the CPU 100 observes RS1 of the first step of the two-step pressing type release switch 312 (S22 in FIG. 18).

When RS1 is detected, the CPU 100 directs the photometry circuit 351 and the distance measuring circuit 361 to conduct photometry, distance measurement, and necessary calculation based on these operations (S23 in FIG. 18).

When photometry, distance measuring and necessary calculation have been completed, the CPU 100 observes the pressing condition of RS2 of the second step of the release switch 312 (S24 in FIG. 18). When RS2 is not detected, the CPU 100 continues the observing operation of RS1 again (S22 in FIG. 18).

When RS2 which means the photographic designation of the operator is detected, the LCD driving circuit 272 stops the display on the image LCD 273 and light emission of the back light 274 (S25 in FIG. 18).

In this case, at least, the light emission of the back light 274 and the drive of the image LCD 273, which consume large electric power, are stopped. In order to stop them as described above, the electric power supply to the section to be stopped may be stopped, or the control signal to stop the operation may be sent to that section.

In this connection, although the display of the image LCD 273 is stopped, the drive of the CCD 213, the storage into the memory 263, and the optical system 210 of the electronic viewfinder section 200 are kept in operable condition.

Under the condition that the display of the image LCD 273 is stopped as described above, the picture-taking operation of the silver halide camera section 300 side is carried out. Initially, based on the distance measuring information, the lens driving circuit 331 drives the lens 321 to focus the object (S26 in FIG. 18).

According to the photometric information, the shutter driving circuit 322 opens the shutter combined with the diaphragm 322 so that a predetermined aperture value is obtained (S27 in FIG. 18). The image picked-up by the CCD 213 is stored in the memory 263 at timing when the shutter is opened (S28 in FIG. 18). After the image pick-up by the CCD, the shutter driving circuit 332 closes the shutter combined with the diaphragm 322 at the time when the predetermined shutter opening time has passed (S29 in FIG. 18).

As described above, under the condition that the display of the image LCD 273 is stopped, the picture-taking operation of the silver halide camera 300 side and the memory storage of the CCD image pick-up result are carried out.

When the picture-taking operation of the camera 300 side and the memory storage of the CCD image pick-up result have been completed, the LCD driving circuit 272 starts the display of the image LCD 273 and the light emission of the back light 274. Herein, the CCD image pick-up result synchronized with the silver halide film picture-taking is read from the memory 263, and is displayed on the image LCD 273 as a static image (S30 in FIG. 18).

Thereby, the result of the silver halide film picture-taking can be confirmed just after the picture-taking. In this connection, because the drive of the CCD 213 is not necessary at the time of the static image display, the operation of the CCD driving circuit 223 is stopped (S31 in FIG. 18). Further, in parallel with the above, the CPU 100 directs the film driving circuit 334 to feed the film so that the camera is ready for the next silver halide film picture-taking.

In this connection, together with the image display of the static image, the CPU 100 directs the character superimposing circuit 271 to superimpose data relating to the picture-taking on the image as character information at need, and to display the image. Further, the image display as the static image is continued until the next film picture-taking is ready.

Figure 19:
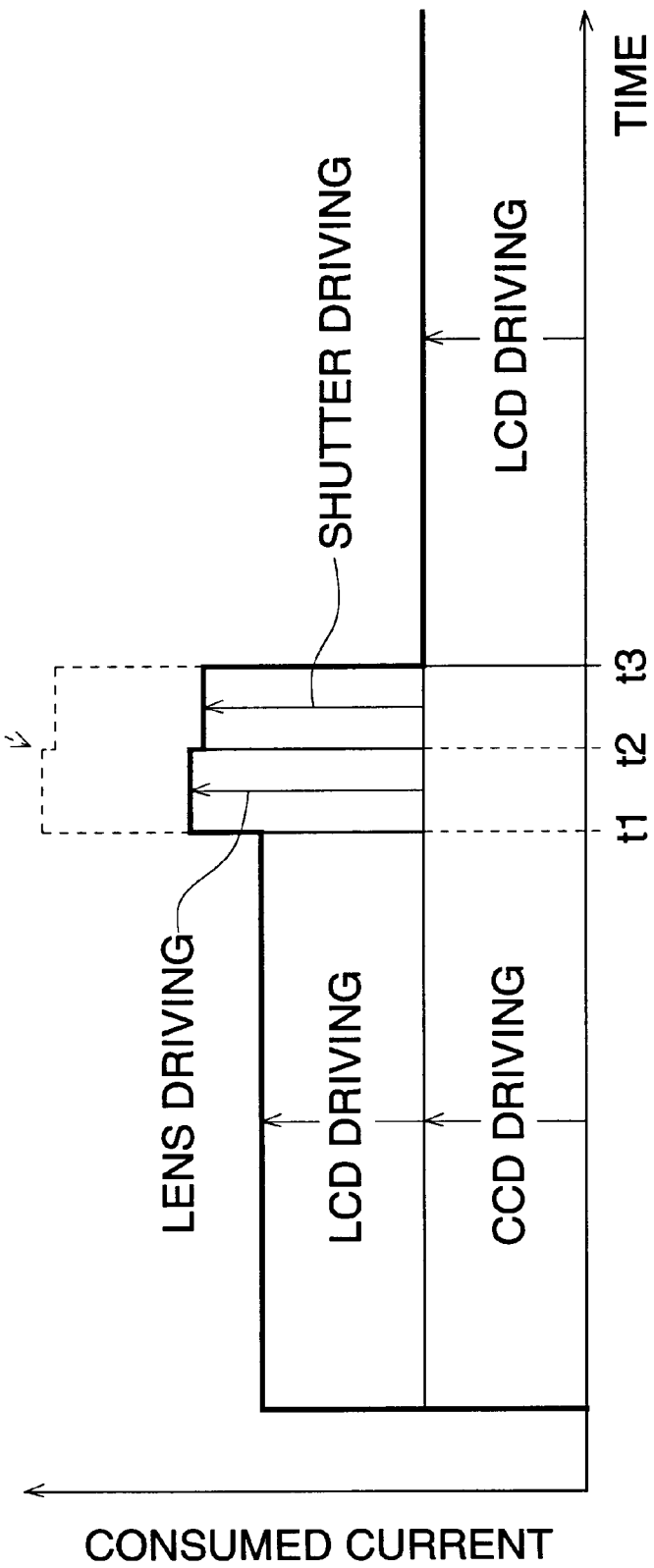
FIG. 19 is a characteristic view showing a condition of consumed current of the silver halide camera equipped with the electronic viewfinder of the example of the present invention.

FIG. 19 is a characteristic view showing an example of a condition of the consumed current of the silver halide camera equipped with the electronic viewfinder which is operated as described above. In FIG. 19, the power source switch 311 is turned ON at time t0, the light emission of the back light 274 is stopped and the drive of the image LCD 273 is stopped at time t1, and lens driving and shutter driving (silver halide film picture-taking and memory storage) of the silver halide camera section 300 side are carried out until time t3. After time t3, the image display of the static image is conducted under the condition that the drive of the CCD is stopped.

As described above, because the CPU 100 controls the electronic viewfinder section 200 to stop the image display while picture-taking is conducted on the silver halide film 323 in the silver halide camera section 300, the drive of the lens 321 or the drive of the shutter combined with the diaphragm 322 and the image display of the electronic viewfinder section 200 are not simultaneously conducted, thereby, the large current does not flow. In this connection, the characteristic shown by a dashed line, shows the consumed current presumed when the silver halide picture-taking is conducted without stopping the image display of the electronic viewfinder section 200.

In the silver halide camera equipped with electronic viewfinder as described above, while picture-taking is conducted by driving the lens 321 or the shutter combined with the diaphragm 322 in the silver halide camera section 300, because the CPU 100 controls the electronic viewfinder section 200 to stop the image display, the drive of the lens 321 or the shutter combined with the diaphragm 322 and the image display of the electronic viewfinder section 200 are not simultaneously conducted, therefore, the large current due to simultaneous drive of both, does not flow. Thereby, the electric power can be sufficiently supplied from the power source circuit 101 to each circuit, so that normal operations can be maintained. As the result, the electric power can be supplied effectively and sufficiently.

(Operations of the silver halide camera equipped with the electronic viewfinder)

Referring to a flow chart in FIG. 20, a series of operations of the silver halide camera equipped with the electronic viewfinder relating to another example of the present invention will be described below.

Figure 20:
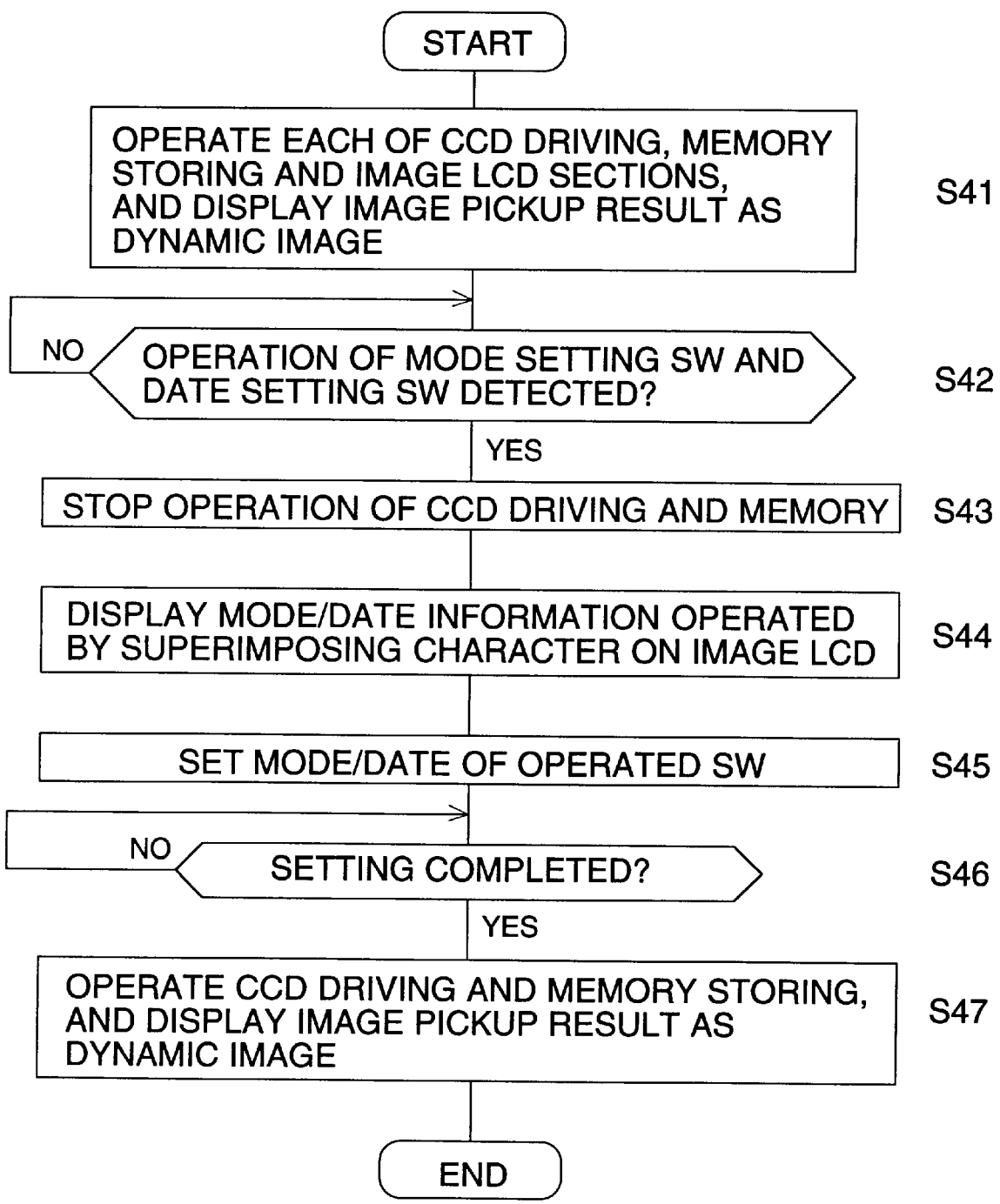
FIG. 20 is a flow chart showing operations of the silver halide camera equipped with the electronic viewfinder of another example of the present invention.

The flow chart shown in FIG. 20 is a subroutine relating to the power saving control, called from a main picture-taking processing routine. That is, it is the processing used when the CPU 100 judges from conditions of each section that the power saving control is necessary.

Initially, when the power source switch 311 is operated, after the CPU 100 has initialized each section, the CPU 100 starts a series of operations of driving of the CCD 213, storing into and reading from the memory 263, and the display of the image LCD 273, and the image pick-up result by the CCD 213 is displayed on the image LCD 273 as the dynamic image (S41 in FIG. 20). By this dynamic image display, the object can be confirmed before picture-taking.

The CPU 100 observes the condition of operation of the mode setting switch 314 and the date setting switch 315 (S42 in FIG. 20). When the setting operation of either of both observed switches is detected, the CPU 100 stops operations of the picture-taking processing circuit system 220 or the digital image data circuit system 260 (S43 in FIG. 20).

Then, the CPU 100 directs the character superimposing circuit 271, corresponding to the content of the set switch, to generates characters corresponding to the set content, and to display the characters on the image LCD 273 (S44 in FIG. 20). Thereby, the operator can conduct date setting or mode setting, referring to the character information displayed on the image LCD 273.

In this connection, when a data LCD is provided other than the image LCD 273, the set content may be displayed on the data LCD, thereby, all displays on the image LCD 273 may be stopped.

When the mode setting or date setting has been completed, the CPU switches camera data so that the data is changed to the set mode or date (S45 in FIG. 20). When such setting and switching of data inside the CPU 100 have been completed (S46 in FIG. 20), the CPU 100 starts a series of operations of driving of the CCD 213, storing into and reading from the memory 263, and the dynamic image display of the image LCD 273, and the image pick-up result by the CCD 213 is displayed on the image LCD 273 as the dynamic image (S47 in FIG. 20). By this dynamic image display, the camera returns to the condition in which the object can be confirmed before picture-taking.

In the silver halide camera equipped with the electronic viewfinder as described above, it is noticed that the image pick-up of the electronic viewfinder section 200 is not necessary while the operator sets data from the setting input means, therefore, at least, the drive of the CCD 213 is stopped, and the set content of the switch is displayed on the image LCD 273.

Accordingly, when the image pick-up and the dynamic image display of the electronic viewfinder section 200 is stopped while the operator does not needs them, useless electric power consumption can be suppressed. As the result, the electric power can be sufficiently supplied.

(Operations of the silver halide camera equipped with the electronic viewfinder)

Referring to a flow chart in FIG. 21, a series of operations of the silver halide camera equipped with the electronic viewfinder relating to yet another example of the present invention will be described below.

Figure 21:
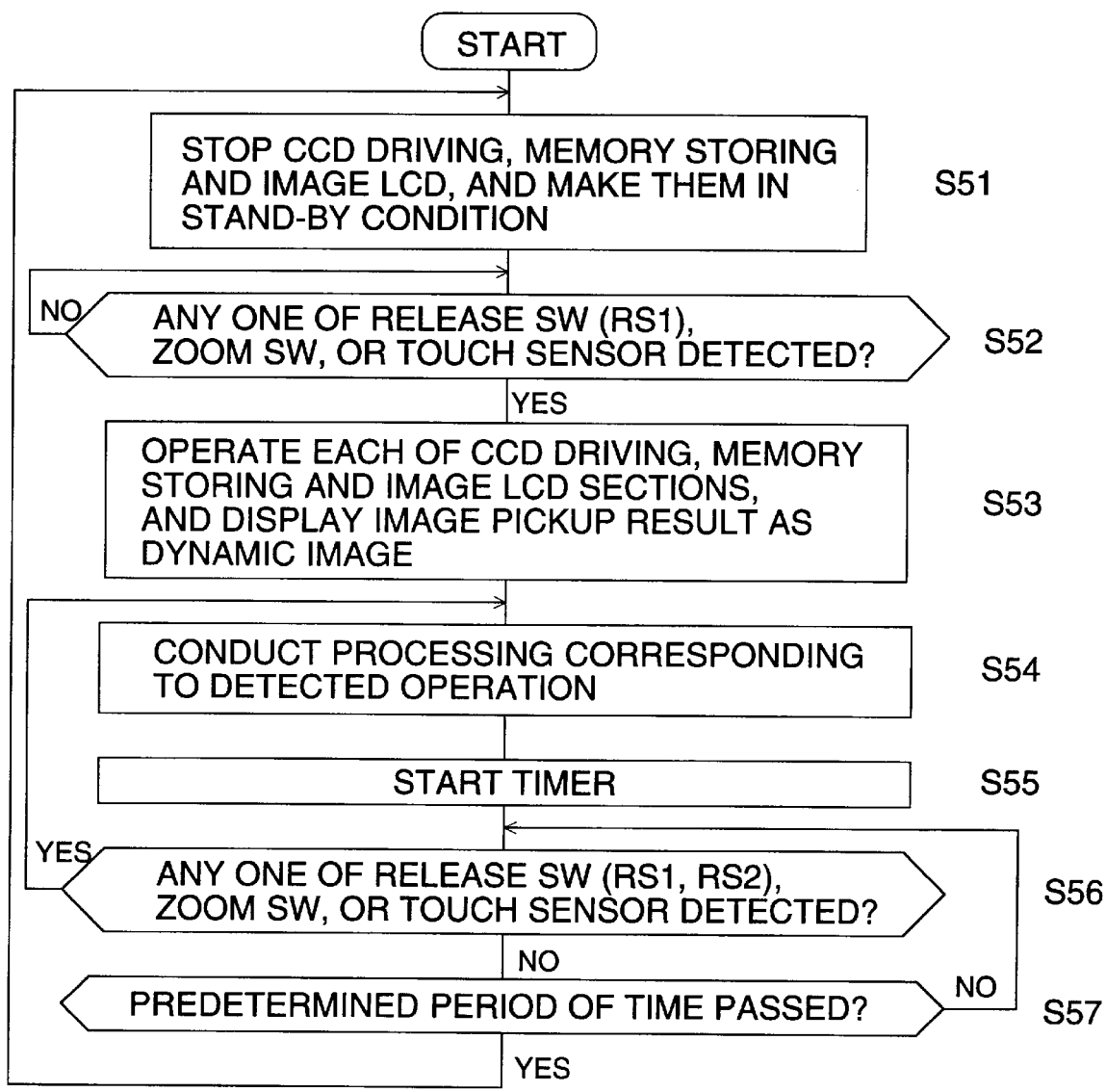
FIG. 21 is a flow chart showing operations of the silver halide camera equipped with the electronic viewfinder of another example of the present invention.

The flow chart shown in FIG. 21 is a subroutine relating to the power saving control, called from a main picture-taking processing routine. That is, it is the processing used when the CPU 100 judges from conditions of each section that the power saving control is necessary.

Initially, when the power source switch 311 is operated, the CPU 100 stops a series of operations of the image pick-up processing circuit system 220, the digital image data circuit system 260 and the display system 270 after the CPU 100 has initialized each section, and the electronic viewfinder section 200 is in stand-by condition in which the dynamic image display of the electronic viewfinder section 200 is stopped (S51 in FIG. 21).

The CPU 100 observes each section, and when no switch is operated for a predetermined period of time, the CPU 100 stops a series of operations of the image pick-up processing circuit system 220, the digital image data circuit system 260 and the display system 270, and makes them in stand-by condition in which the dynamic image display of the electronic viewfinder section 200 is stopped (S51 in FIG. 21).

The CPU 100 observes any operation condition relating to the picture-taking (S52 in FIG. 21). The operations to be observed in this case correspond to operations in the case where the operator intends to take a picture, such as halfway pressing of the release switch 312 (RS1), the operation of the zoom switch 313, gripping the grip (touch sensor 317), etc.

When any operation of the observed switches is detected, the CPU 100 starts a series of operations of driving of the CCD 213, storing into and reading from the memory 263, and the dynamic image display of the image LCD 273, and the image pick-up result by the CCD 213 is displayed on the image LCD 273 as the dynamic image (S53 in FIG. 21). By this dynamic image display, the camera is in the status in which the object can be confirmed before picture-taking.

The CPU 100 directs the related circuits corresponding to the content of operated switch, and conducts processing corresponding to the content of operated switch (S54 in FIG. 21). Further, the CPU starts a timer which measures the predetermined time (S55 in FIG. 21).

Further, the CPU 100 observes the status of any operation relating to the picture-taking (S52 in FIG. 21). The operations to be observed in this case, correspond to operations in the case where the operator intends to take a picture, such as halfway pressing (RS1)/full pressing (RS2) of the release switch 312, the operation of the zoom switch 313, gripping the grip (touch sensor 317), etc.

Herein, when any operation is conducted, the CPU 100 directs the circuit corresponding to the content of operated switch, and conducts processing corresponding to the operated content (S54 in FIG. 21).

In the status in which no operation is conducted, when it is confirmed by the timer that the predetermined time has passed (S57 in FIG. 21), the CPU stops a series of operations of driving of the CCD 213, storing into and reading from the memory 263, and the display of the image LCD 273, and makes them in stand-by condition in which the dynamic image display of the electronic viewfinder section 200 is stopped (S51 in FIG. 21).

Thereby, even when the operator does not operate the start of display of the electronic viewfinder section 200, the electronic viewfinder section 200 can return from the stand-by condition to the dynamic image display.

In the silver halide camera equipped with the electronic viewfinder as described above, it is noticed that the image pick-up and display of the electronic viewfinder section 200 are not necessary until the operator conducts any operation relating to picture-taking from the operation switch, or the like, and the drive of the CCD 213 and the display onto the image LCD 273 are stopped. When the operator conducts any operation relating to picture-taking, the dynamic image display starts.

Accordingly, the image pick-up and display of the electronic viewfinder section 200 while the operator does not intend to take a picture, are stopped, and the dynamic image display starts when the operator intends to take a picture. Thereby, useless electric power consumption can be suppressed. As the result, the electric power can be sufficiently supplied.

Further, after the dynamic image display starts when the operator conducts any operation concerning the picture-taking, the dynamic image display may be stopped also when any operation is not conducted further in a predetermined period of time. In this case, when any operation is conducted but picture-taking is not actually conducted, the useless electric power consumption can be suppressed.

Further, the useless electric power consumption can be suppressed by conducting an auto power-off operation also on the silver halide camera section 300 side when the camera is in stand-by condition.

(Operations of the silver halide camera equipped with the electronic viewfinder)

Referring to a flow chart in FIG. 22, a series of operations of the silver halide camera equipped with the electronic viewfinder relating to another example of the present invention will be described below.

Figure 22:
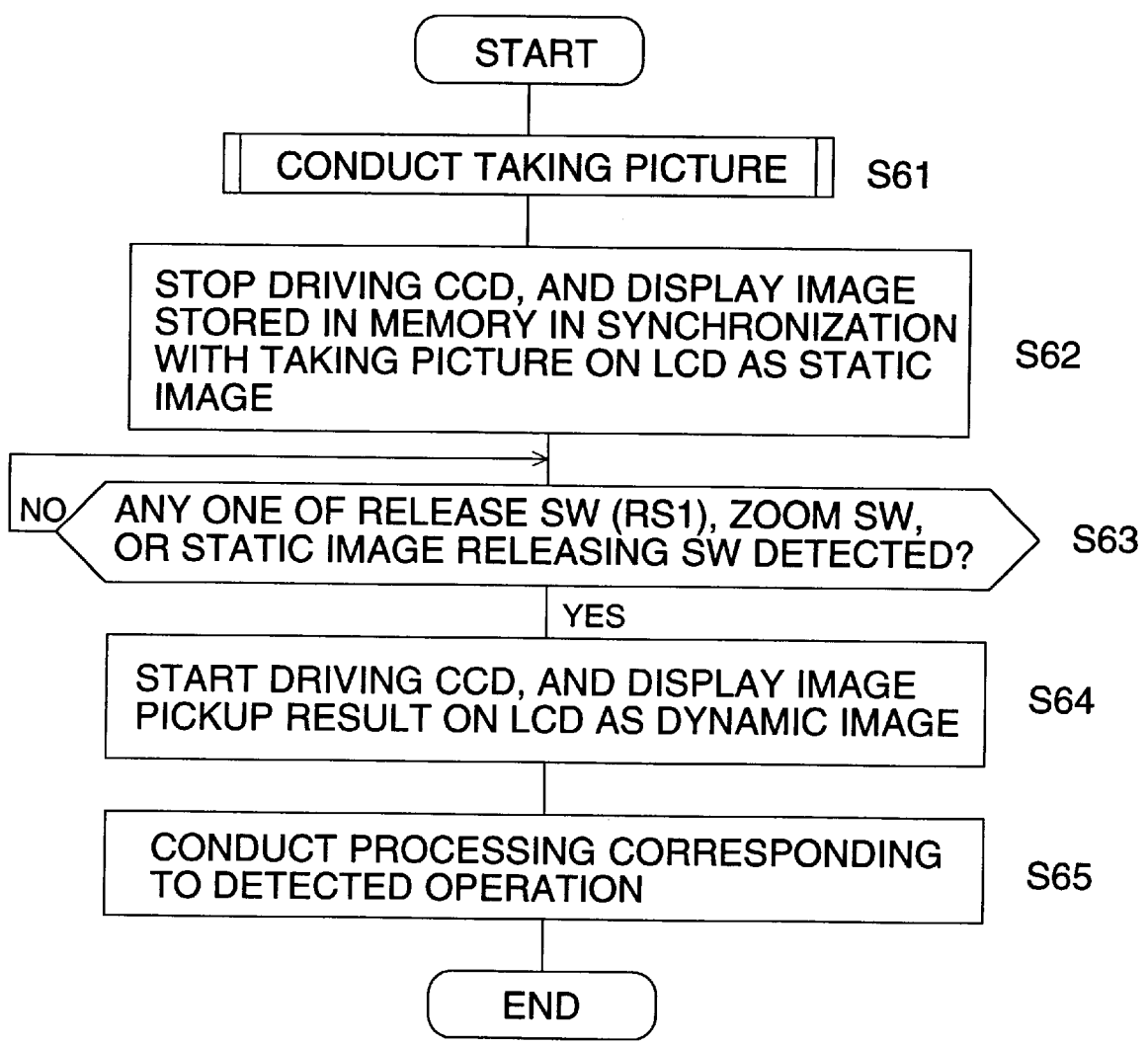
FIG. 22 is a flow chart showing operations of the silver halide camera equipped with the electronic viewfinder of another example of the present invention.

The flow chart shown in FIG. 22 is a subroutine relating to the power saving control, called from a main picture-taking processing routine. That is, it is the processing used when the CPU 100 judges from conditions of each section that the power saving control is necessary after picture-taking.

Initially, by previously described operations, picture-taking onto the silver halide film 323 and image data storing into the memory 263 synchronized with the picture-taking are conducted by the directions of the CPU 100 (S61 in FIG. 22).

When the picture-taking operation of the camera section 300 and memory storing of the image pick-up result by the CCD have been completed, the image pick-up result by the CCD synchronized with the silver halide film picture-taking is read from the memory 263 and displayed on the image LCD 273 as a static image (S62 in FIG. 22). Thereby, the result of silver halide film picture-taking can be confirmed just after picture-taking.

The image display as the static image is continued until the camera is ready for the next film picture-taking. In this case, the drive of the CCD 213 is stopped.

The CPU 100 observes conditions of any operation relating to the picture-taking (each switch operated when the operator intends for the next picture-taking, such as halfway pressing of the release switch 312 (RS1), the operation of the zoom switch 313, the operation the static image releasing switch 316, etc.) (S63 in FIG. 22).

When any operation of the observed switches is detected, the CPU 100 starts a series of operations of driving of the CCD 213, storing into and reading from the memory 263, and the dynamic image display of the image LCD 273, and the image pick-up result by the CCD 213 is displayed on the image LCD 273 as the dynamic image (S64 in FIG. 22). By this dynamic image display, the camera is in the status in which the object can be confirmed before picture-taking.

The CPU 100 directs the related circuits corresponding to the content of operated switch, and conducts processing corresponding to the content of operated switch (S65 in FIG. 22). The CPU 100 conducts photometry and distance measurement when the content of the operated switch is the halfway pressing of the release switch, or driving of the lens 321 when it is the operation of the zoom switch.

Thereby, even when the operator does not operate the static image releasing switch 316 to release the static image display of the electronic viewfinder section 200, the electronic viewfinder section 200 can return from the static image display condition (confirmation of the picture-taking result just after the picture-taking) to the dynamic image display (confirmation of the object for the next picture-taking).

In the silver halide camera equipped with electronic viewfinder as described above, it is detected that the operator conducts any operation concerning the next picture-taking from the operation switches, and the display is switched from the static image display to the dynamic image display.

Accordingly, when the operation which means the stand-by operation for the next picture-taking, is also detected other than the operation of the static image releasing switch 316, and the static image display is stopped and switched to the dynamic image display, the useless operation can be suppressed. As the result, operations can effectively be conducted.

Further, the drive of the CCD 213 is stopped in a period of time in which the operator does not intend to take a picture, and the drive of the CCD 213 is started when it is detected that the operator intends to take a picture. Thereby, the useless electric power consumption can be suppressed. As the result, the electric power can be supplied effectively and sufficiently.

(Operations of the silver halide camera equipped with the electronic viewfinder)

Referring to a flow chart in FIG. 23, a series of operations of the silver halide camera equipped with the electronic viewfinder relating to another example of the present invention will be described below.

Figure 23:
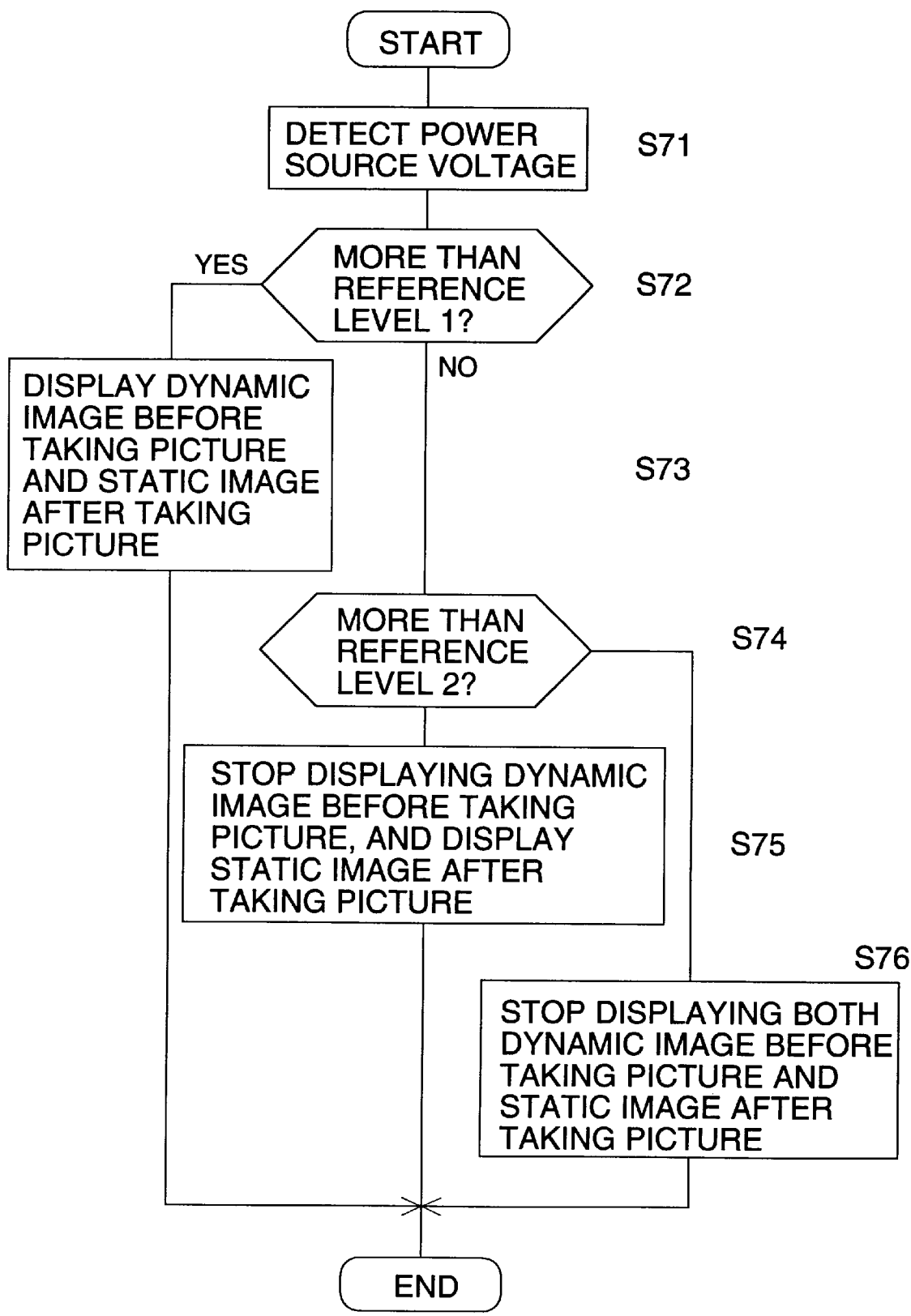
FIG. 23 is a flow chart showing operations of the silver halide camera equipped with the electronic viewfinder of another example of the present invention.

The flow chart shown in FIG. 23 is a subroutine relating to the power saving control, called from a main picture-taking processing routine. That is, it is the processing used when the CPU 100 judges that the power saving control is necessary, from conditions of the power source circuit 101.

Initially, the CPU 100 detects voltage of a battery serving as the power source 101 (S71 in FIG. 23). Herein, the CPU 100 structures a power source condition detecting means. In this connection, the degree of consumption of the battery can be calculated from the time of use of the battery after the completion of the electronic flash charging.

Incidentally, in order to switch operations of the silver halide camera equipped with the electronic viewfinder corresponding to the degree of consumption of the battery, the following reference levels are determined:

(1) the reference level 1 of the voltage which can operates the overall electronic viewfinder section 200 and silver halide camera section 300;

(2) the reference level 2 of the voltage which can hardly operate the overall electronic viewfinder section 200 and silver halide camera section 300, but can operate the overall silver halide camera section 300 and a part of the electronic viewfinder section;

(3) the reference level 3 of the voltage in which all operations of the electronic viewfinder section are preferably stopped so that the overall silver halide camera section 300 can be operated.

When the detected value is not less than a predetermined reference level 1 (S72 in FIG. 23), the CPU 100 controls the electronic viewfinder section 200 so that the dynamic image display before picture-taking, and the static image display after the picture-taking are conducted (S73 in FIG. 23).

Figure 24:
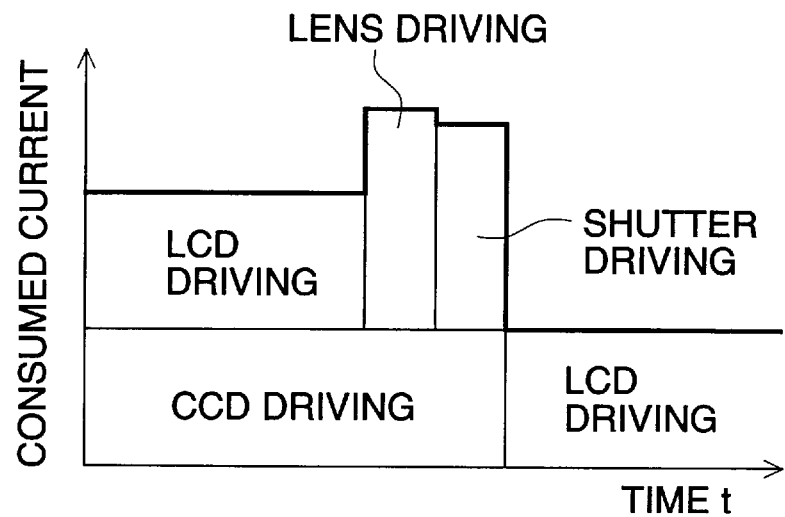
FIGS. 24(a), 24(b) and 24(c) are characteristic views showing a condition of consumed current of the silver halide camera equipped with the electronic viewfinder of the example of the present invention.
Figure 24:
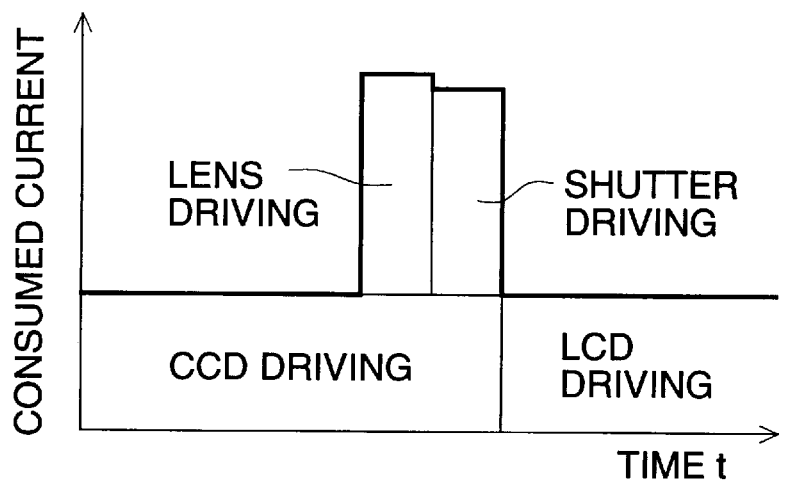
Figure 24:
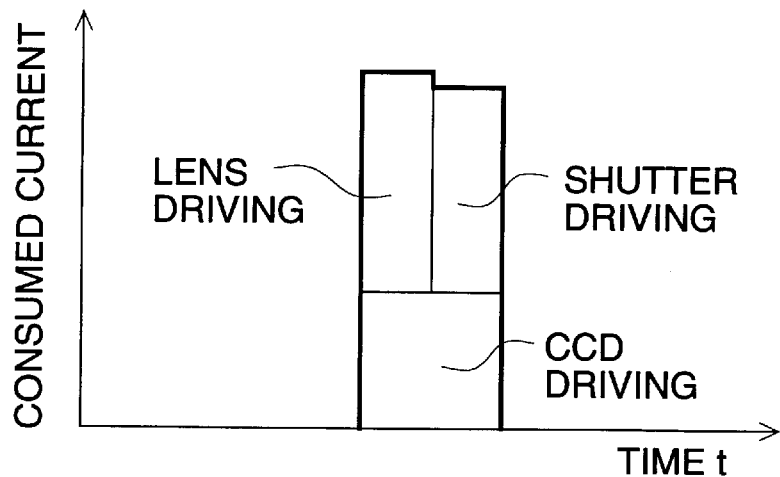

Thereby, as the silver halide camera equipped with the electronic viewfinder as described above, normal operations can be conducted. The consumed current of the display mode can be expressed as shown in FIG. 24(a).

Further, when the detected value is more than a predetermined reference level 1 and more than the reference level 2 (S74 in FIG. 23), the CPU 100 controls the electronic viewfinder section 200 so that the dynamic image display before picture-taking is stopped and the static image display after the picture-taking is conducted (S75 in FIG. 23).

Thereby, although it is necessary to confirm the object before picture-taking by the optical viewfinder, after picture-taking, the result of the silver halide film picture-taking can be confirmed just after the picture-taking by displaying the image as a static image in the electronic viewfinder section 200. The consumed current in the display mode can be expressed as shown in FIG. 24(b). In this connection, the static image display in this case may be conducted for only a predetermined period of time.

Further, in this case, the CPU 100 conducts the drive of the CCD 213 and storing in the memory 263 before picture-taking, and stops the drive of the image LCD 273 or light emission of the back light 274 for electric power saving.

Further, after picture-taking, although the CPU 100 conducts reading from the memory 263, the drive of the image LCD 273, and light emission of the back light 274, the CPU 100 stops the drive of the CCD 213 for electric power saving.

When the detected level is not more than reference level 2 (S74 in FIG. 23), the CPU 100 controls the electronic viewfinder section 200 to stop the dynamic image display before picture-taking and the static image display after picture-taking (S76 in FIG. 23). The consumed current in this mode can be expressed as shown in FIG. 24(c).

Thereby, it is necessary to confirm the object before picture-taking by the optical viewfinder, and the static image display by the electronic viewfinder section 200 can not be confirmed also after picture taking, however, the same operations as the conventional silver halide camera can be conducted without any trouble.

In this connection, in this case, the CPU 100 controls the electronic viewfinder section 200 to stop the operation for electric power saving so that the consumption of the battery can be suppressed to the utmost.

In the silver halide camera equipped with the electronic viewfinder as described above, the CPU 100 controls the electronic viewfinder section 200 so that its image pick-up and display is stopped stepwise, corresponding to the consumption of the battery constituting the power source.

In the above example, the display mode is switched to the first, the second, and the third steps. However, the display mode may be switched to, for example, the first step and the second step, or the first step and the third step. Further, instead of switching the display mode by detecting the consumption of the battery by the CPU 100, the operator may switch the display mode by providing a manual change-over switch (display switching operation section). The display switching operation section may be combined with other switch or a switch for exclusive use.

Accordingly, when the operation of the electronic viewfinder means is switched stepwise corresponding to the consumption of the battery, the operator is not caused to conduct troublesome operations such as operation mode switching of the electronic viewfinder section 200, operations of the silver halide camera section 300 are maintained, and the electric power can be effectively supplied so that the overall working time is extended. Thereby, the situation to stop even the operation of the silver halide camera section 300 due to the consumed current of the electronic viewfinder section 200 when the consumption of the battery becomes large, can be avoided.

(Operations of the silver halide camera equipped with the electronic viewfinder)

Referring to a flow chart in FIG. 25, a series of operations of the silver halide camera equipped with the electronic viewfinder relating to another example of the present invention will be described below.

Figure 25:
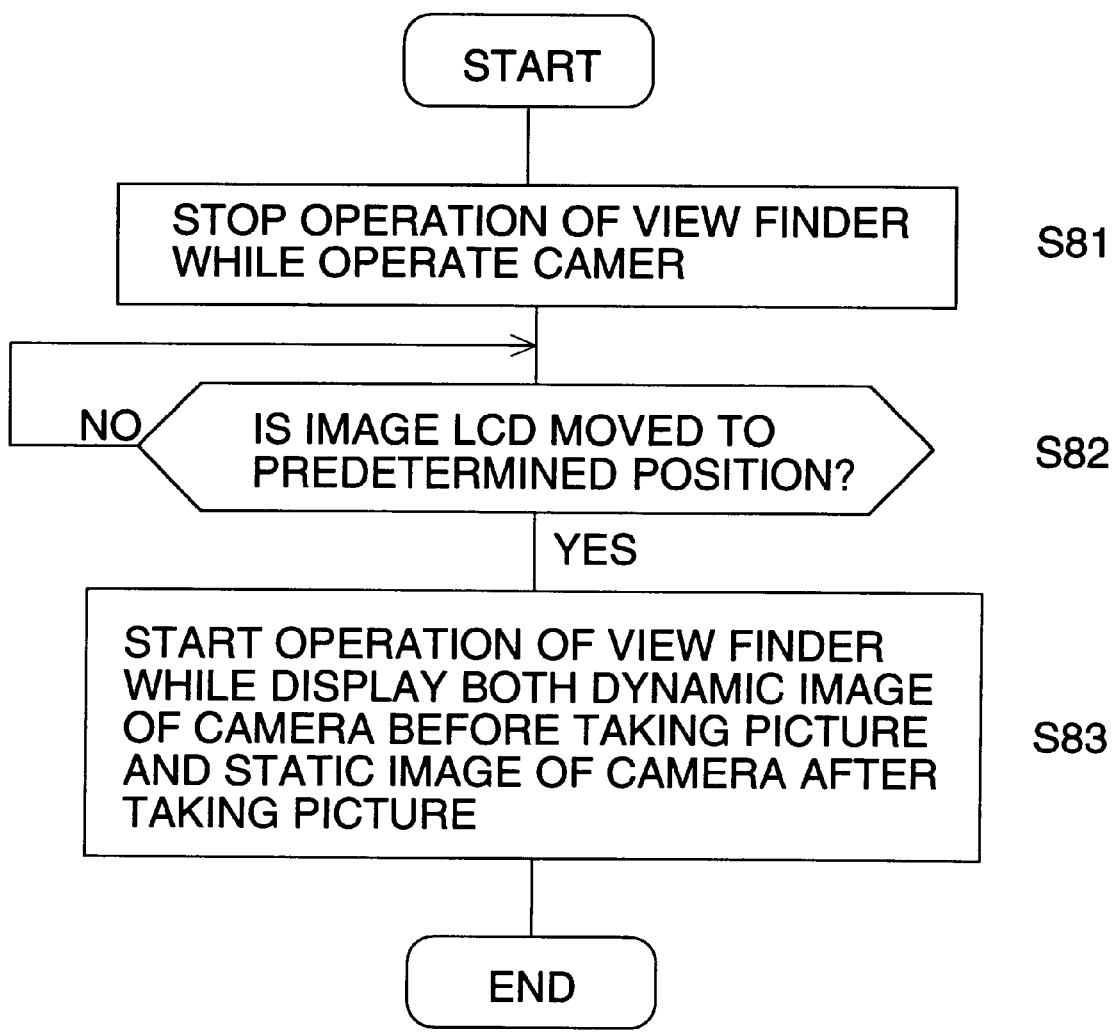
FIG. 25 is a flow chart showing operations of the silver halide camera equipped with the electronic viewfinder of another example of the present invention.

The flow chart shown in FIG. 25 is a subroutine relating to the power saving control, called from a main picture-taking processing routine. That is, it is the processing used when the CPU 100 judges that the power saving control is necessary, from conditions of the image LCD 273.

Initially, when the power source switch 311 is operated, the CPU 100 stops a series of operations of the drive of the CCD 213, storing into and reading from the memory 263, and the display of the image LCD 273, after the CPU 100 has initialized each section, and the electronic viewfinder section 200 is in stand-by condition in which the display of the electronic viewfinder section 200 is stopped (S81 in FIG. 25).

Figure 26:
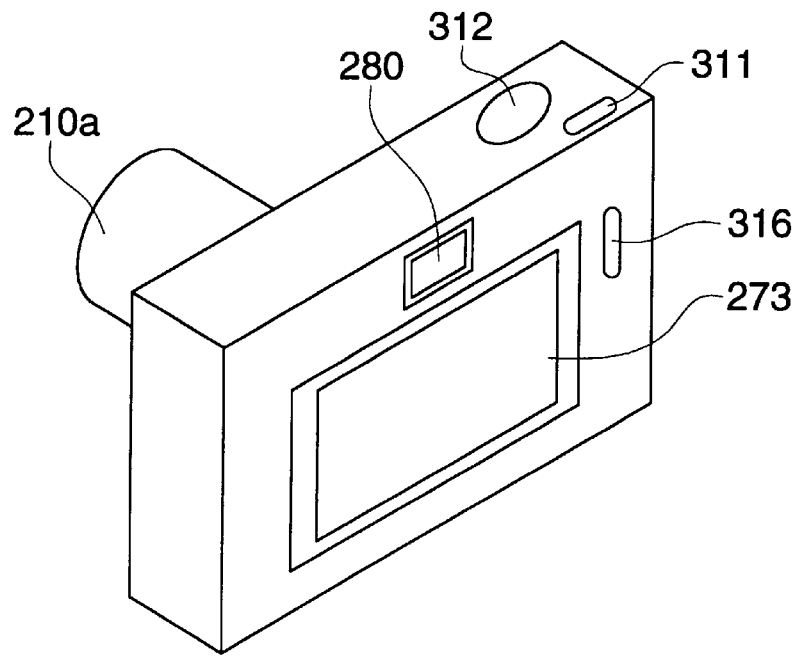
FIGS. 26(a) and 26(b) are perspective views showing conditions of the operation of the silver halide camera equipped with the electronic viewfinder of the example of the present invention.
Figure 26:
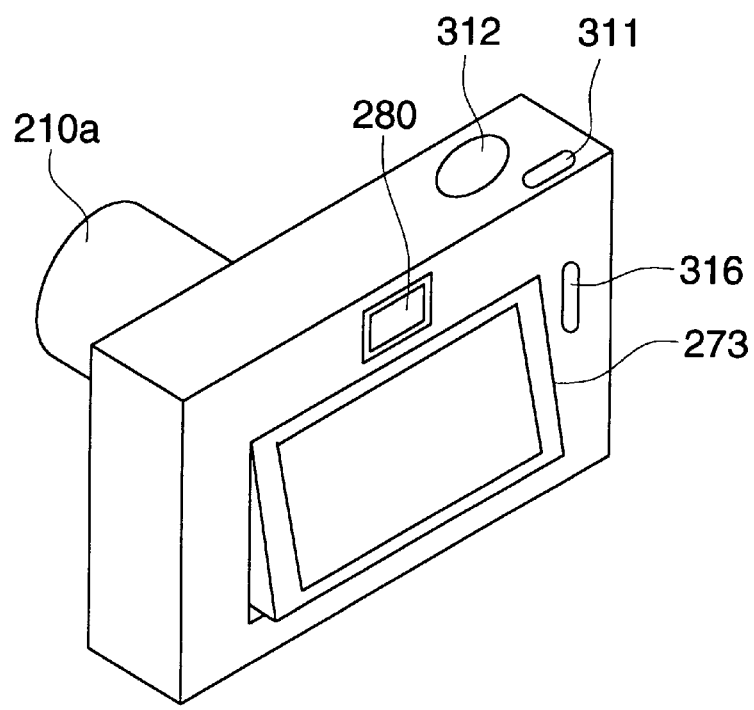

Then, the CPU 100 observes the position (tilted condition) of the image LCD 273 (S82 in FIG. 25). FIG. 26(a) is a condition (initial condition) in which the image LCD 273 is housed.

When it is detected that the observed position of the image LCD 273 is in a predetermined condition, the CPU 100 starts a series of operations of the drive of the CCD 213, storing into and reading from the memory 263, and the dynamic image display of the image LCD 273, and the image pick-up result by the CCD 213 is displayed on the image LCD 273 as a dynamic image (S83 in FIG. 25). By the dynamic image display, the object can be confirmed before picture-taking. Further, the static image is displayed after the picture-taking, and the photographed image can be confirmed.

FIG. 26(b) shows the tilted condition (usable condition) of the image LCD 273. In this connection, the condition shown in FIG. 26(b) is an example, and even in a condition other than that, (further pulled-out condition than that), when the image LCD 273 is pulled out of the housed condition even a little, the CPU 100 judges that the operator starts the operation for starting the picture-taking, and conducts the image display.

In this case, a switch to judge the housed condition of the image LCD 273 and the condition except that, is provided and the CPU controls each section to switch above-described conditions according to that detection result.

That is, in such the control, it is noticed that the image pick-up and the display of the electronic viewfinder means are not necessary until the operator sets the display section at a predetermined position, and the drive of the CCD 213 and the display onto the image LCD 273 are stopped until the display section is set at a predetermined position and when the operator sets the display section at a predetermined position, the drive of the CCD 213 and the display onto the image LCD 273 are started.

As described above, when the condition of the image LCD 273 and the display operation of the electronic viewfinder section 200 are interlocked with each other, the image pick-up and display of the electronic viewfinder section 200 while the operator does not intend to take a picture, are stopped, and the image pick-up and display of the electronic viewfinder section 200 are started when the operator intends to take a picture. Thereby, useless electric power consumption can be suppressed. As the result, the electric power can be supplied effectively and sufficiently by the simple operation.

Figure 27:
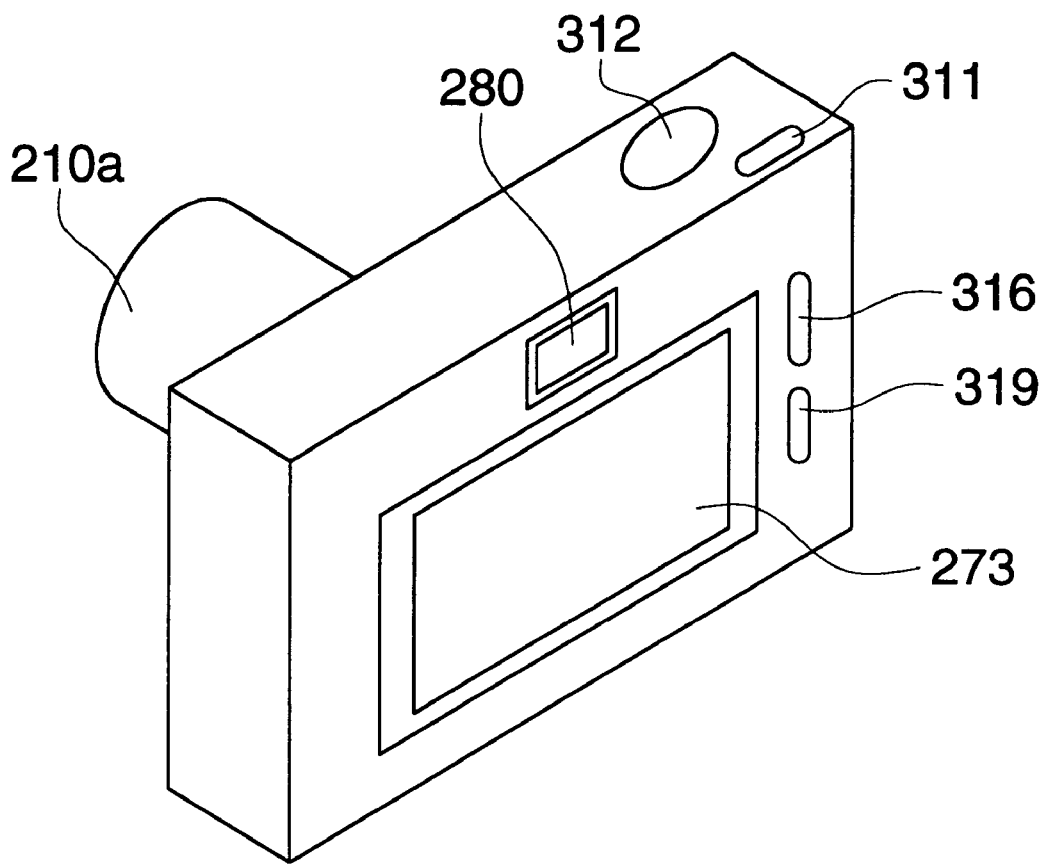
FIG. 27 is a perspective view showing another structural example of the silver halide camera equipped with the electronic viewfinder of the example of the present invention.

Further, the image LCD 273 is not moved, a display start operation section 319 is provided as shown in FIG. 27, and the display condition can be switched by the signal from the display start operation section 319. In this case also, the electric power can be supplied effectively and sufficiently by the simple operation. In this connection, the display start operation section 319 can also be combined with other switch.

The described embodiment can be varied by a skilled person without departing from the spirit and scope of the invention.

As detailed in examples, according to each invention described in the present specification, the following effects can be obtained.

In the silver halide camera equipped with the electronic viewfinder of the present invention, the electronic viewfinder means is provided in the camera and the image display section of the electronic viewfinder means is provided on the rear surface of the camera, thereby, the photographed image can be confirmed without developing or printing the silver halide film.

What is claimed is:

1. A camera for forming a photographic image on a silver halide photographic film comprising:
    (a) a mechanism including a lens and a lens shutter adapted to photograph an object by exposing said silver halide film to said object;
    (b) an electronic viewfinder, having a solid state image sensor and a direct view section, adapted to display, on said direct view section, a viewfinder image received by said image sensor, said direct view section being on a back of a main body of said camera; and
    (c) an image processor adapted to adjust, based on information supplied by said mechanism, said viewfinder image to a maximum size which said direct view section can display, said electronic viewfinder displaying an aspect ratio corresponding to a degree of magnification of said viewfinder image.

2. The camera of claim 1 wherein said image processor comprises a variable magnification optical system.

3. The camera of claim 1, wherein the sliver halide film for use in the silver halide photographing means is housed in a cartridge which is loaded from a bottom side of the main body of the camera along an axial direction of a film-winding shaft of the silver halide film.

4. The camera of claim 1, wherein the image displaying section of the electronic viewfinder is movable with respect to the main body of the camera.

5. The camera of claim 1, wherein the image displaying section of the electronic viewfinder is detachably attachable to the main body of the camera.

6. The camera of claim 1, wherein the electronic viewfinder displays the image with substantially the same field angle as that of an image on the silver halide film photographed by the silver halide photographing means.

7. A camera for forming a photographic image on a silver halide photographic film comprising:
    (a) a mechanism including a lens and a lens shutter adapted to photograph an object by exposing said silver halide film to said object;
    (b) an electronic viewfinder, having a solid state image sensor and a direct view section, adapted to display a viewfinder image received by said image sensor on said direct view section, said direct view section on a back of a main body of said camera;
    (d) a control for a shutter speed of said lens shutter based upon an exposure value, said mechanism comprising a first diaphragm for said silver halide film adapted to change an aperture value in accordance with an amount of incident light;
    (e) said control adapted to control an amplification factor of said electronic viewfinder based on an image pickup signal, whereby a shutter speed of said electronic viewfinder substantially coincides with a shutter speed of said lens shutter, thereby obtaining an optimum exposure.

8. The camera of claim 7 wherein said mechanism comprises a second diaphragm for said solid state image sensor adapted to change an aperture value in accordance with incident light.

9. The camera of claim 8 wherein the diaphragm for the solid-state image sensor changes the aperture value stepwise in accordance with said incident light.

10. A camera for forming a photographic image on a silver halide photographic film comprising:
    (a) a mechanism including a lens and a lens shutter adapted to photograph an object by exposing said silver halide film to said object;
    (b) an electronic viewfinder, having a solid state image sensor and a direct view section, adapted to display a viewfinder image received by said image sensor on said direct view section, said direct view section on a back of a main body of said camera;
    (f) a setting input device for setting said camera in a photographing mode or a date mode to control said direct view section so that said electronic viewfinder does not display said viewfinder image while said setting input device is actuated.

11. A camera for forming a photographic image on a silver halide photographic film comprising:
   (a) a mechanism including a lens and a lens shutter adapted to photograph an object by exposing said silver halide film to said object;
   (b) an electronic viewfinder, having a solid state image sensor and a direct view section, adapted to display a viewfinder image received by said image sensor on said direct view section, said direct view section on a back of a main body of said camera;
   (g) said electronic viewfinder adapted to display said viewfinder image in a plurality of display modes,
   (h) a power source, providing electric power to said mechanism and said electronic viewfinder, having a detector to detect an exhaustion state of said power source, and adapted to output a plurality of switching signals based on said exhaustion state;
   (i) a display mode switch adapted to switch said camera between a plurality of display modes on said direct view section while maintaining a supply of said electric power to said mechanism, said display mode switch adapted to switch among said plurality of display modes in response to said switching signals.

12. The camera of claim 11 wherein the plurality of display modes includes at least one mode in which a static image is displayed for confirmation of an image to be photographed, or another mode in which an image pickup, or a display of a dynamic or a static image, is not conducted, and said plurality includes a mode in which said image pickup for confirmation of an object to be photographed is displayed along with the display of the dynamic image as well as the display of the static image for confirmation of the image to be photographed.

13. A camera for forming a photographic image on a silver halide photographic film comprising:
   (a) a mechanism including a lens and a lens shutter adapted to photograph an object by exposing said silver halide film to said object;
   (b) an electronic viewfinder, having a solid state image sensor and a direct view section, adapted to display a viewfinder image received by said image sensor on said direct view section, said direct view section on a back of a main body of said camera;
   (j) said direct view section being movable relative to a main body of said camera, a detection device for determining the location of said direct view section, and a control for driving said electronic viewfinder to where said direct view section reaches a predetermined position based on information received from said detection device.

* * * * *